United States Patent [19]

Yan et al.

[11] Patent Number: 4,570,233

[45] Date of Patent: Feb. 11, 1986

[54] MODULAR DIGITAL IMAGE GENERATOR

[75] Inventors: Johnson K. Yan, Milpitas; Judit K. Florence, Menlo Park, both of Calif.

[73] Assignee: The Singer Company, Binghamton, N.Y.

[21] Appl. No.: 394,229

[22] Filed: Jul. 1, 1982

[51] Int. Cl.$^4$ ............... G06F 15/626; G09C 9/00
[52] U.S. Cl. ..................... 364/522; 340/723; 340/747; 358/104
[58] Field of Search ............... 364/521, 522; 358/103, 358/104; 434/38, 43; 340/703, 723, 724, 728, 729, 747

[56] References Cited

U.S. PATENT DOCUMENTS

| | | | |
|---|---|---|---|
| 3,602,702 | 8/1971 | Warnock | 364/522 |
| 3,944,997 | 3/1976 | Swallow | 340/747 |
| 4,197,590 | 4/1980 | Sukonick et al. | 340/747 X |
| 4,276,029 | 6/1981 | Gibson et al. | 434/43 |
| 4,343,037 | 8/1982 | Bolton | 358/104 X |

OTHER PUBLICATIONS

"Single-Chip Controller for Color Graphics Systems"; Electronic Product Design; Sep. 1980; pp. 50–53.
"Video Display Processor Simulates Three Dimensions"; Electronics, vol. 53, No. 25; Nov. 20, 1980; pp. 123–126.

Primary Examiner—Parshotam S. Lall
Assistant Examiner—Kevin J. Teska
Attorney, Agent, or Firm—Barry L. Haley

[57] ABSTRACT

A digital image generator (DIG) that realizes a modular architecture. The DIG employs a geometric processor that processes a plurality of prioritized faces which comprise an image to be displayed. The faces, in turn, comprise a plurality of picture elements (pixels) which are processed according to whether a skip over logic device determines that the pixels are visible and not occulted. Pixels that are in fact visible are processed, in part, by a Bed of Nails (BON) device-spatial filter device combination. This combination provides quantization of a visible pixel at a subpixel resolution level. Pixels that have been so processed are stored in a frame buffer memory for input to a display.

14 Claims, 27 Drawing Figures

SCANLINE BASED PROCESSOR
(Prior Art)

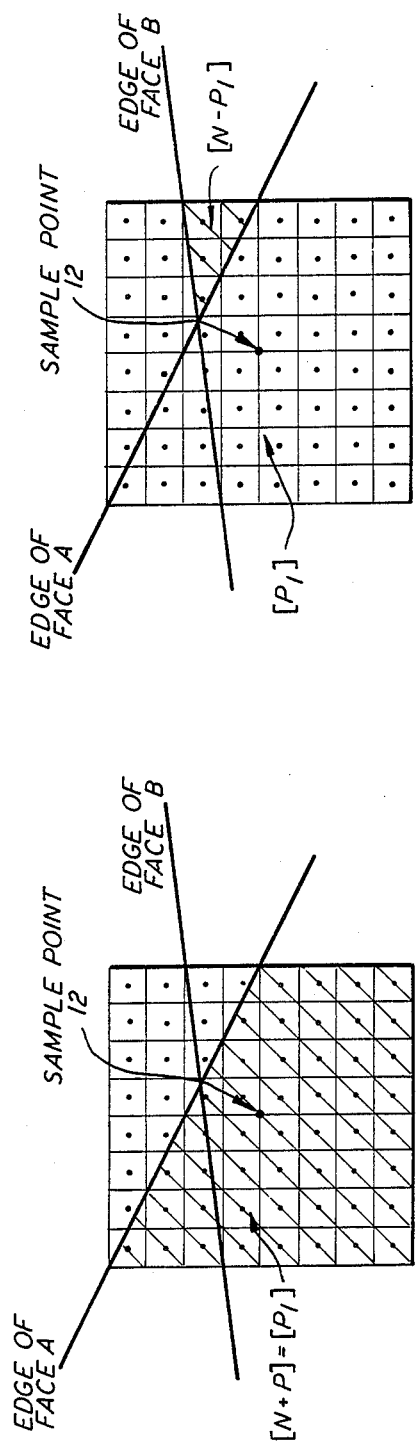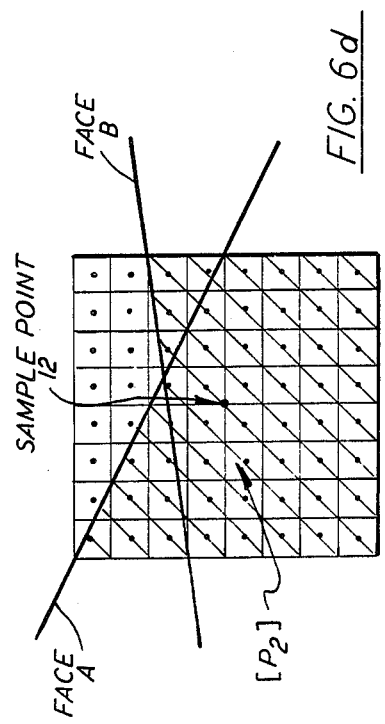

Sample Area

Block

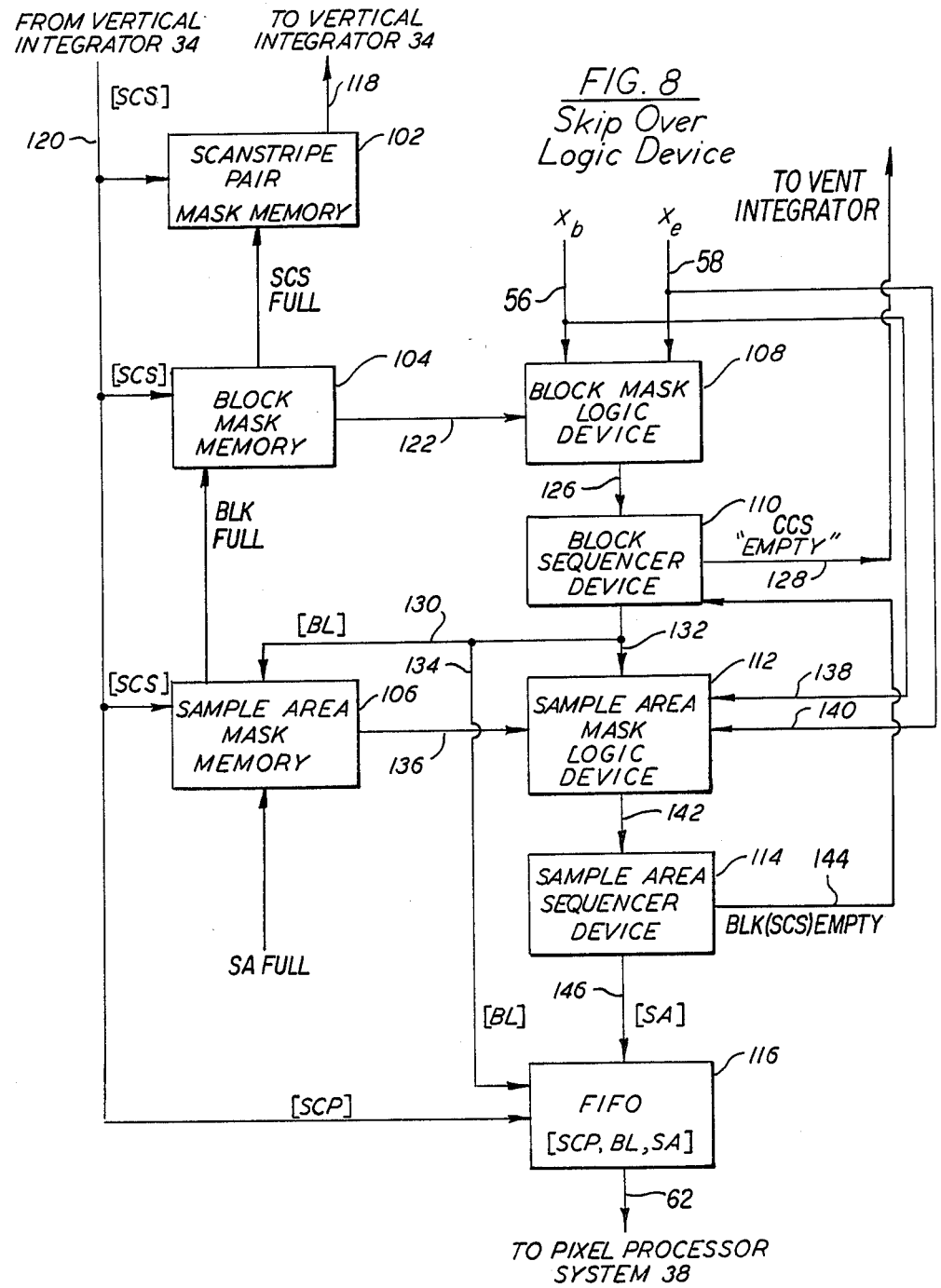

MODULAR DISTRIBUTED
PIXEL PROCESSING
SYSTEM

MULTI-CHANNEL
MODULAR DIG

MODULAR DIGITAL IMAGE GENERATOR

TECHNICAL FIELD

The present invention relates to a digital image generator for use in a flight simulator, and more particularly to a digital image generator that employs a modular architecture.

BACKGROUND ART

To obtain a desired realism, many flight simulators use a digital image generator (hereinafter DIG) to provide a trainee pilot with a view out of the window of a mock cockpit. For maximum training capability, such a DIG ideally provides imagery that is in correspondence with the view observed by the pilot during an actual flight.

It is impossible, however, in today's state of the art, to design and build a DIG that realizes this ideal capability. Nevertheless, it is possible to design and build a DIG that provides the trainee pilot with effective training cues.

To this end, it is desireable to select a particular DIG architecture that addresses the following design objectives. Thus, for example, the DIG should generate images that are free from anomalies or aliasing effects, so that the image does not exhibit stair-stepping, crawling, line breakup or scintillation.

To optimize the efficiency of the DIG, the selected DIG architecture should provide a mechanism that allows the DIG to operate near its maximum capacity. This means that even a properly designed machine will occasionally become overloaded. When this happens, however, the image quality should degrade gracefully.

Additionally, the DIG should be able to readily incorporate a texture capability, so that the trainee pilot is provided with important speed and altitude cases. Further, the DIG should be able to incorporate a translucency capability, so that clouds, smoke and dynamic shadowing effects can be introduced into a scene, thus enhancing its realism. A translucency capability, moreover, provides appropriate changes in the scene content of an image. Thus, when the amount of detail in the scene is changed, a new image is introduced gradually and imperceptibly, instead of "popping" into view.

As indicated above, it is desireable to select a particular DIG architecture that addresses the aforementioned design objectives. One important DIG architecture now being used that does not, in an entirely satisfactory manner, meet the required design objectives, is shown in FIG. 1. The DIG architecture of FIG. 1 is organized as a scanline based processor. This means that an image is generated scanline by scanline, synchronously with a displayed image. The basic operation of this processor is now set forth. A more thorough analysis may be found in the article "Computer Image Generation for Flight Simulation" by B. Schachter in Computer Graphics and Applications, October 1981.

Accordingly, the scanline based processor shown in FIG. 1 includes a geometric processor 10, a scanline computer 12, a video generator 14 and a display 16. The geometric processor 10 interfaces with a data base 18 which supplies the geometric processor 10 with the information that is used to process a particular image. In particular, this information includes a description of the objects that comprise the image. The objects, themselves, are described by a list of "faces" and the faces, in turn, are defined by a list of "edges".

The geometric processor 10, therefore, is supplied with a list of faces which describe objects. The geometric processor 10 acts on this list of faces and performs elimination of backward facing surfaces, geometric transformations and windowing. The geometric processor 10 also provides a tonal description (such as shading and fading) of each face. The geometric processor computations are stored in a memory (not shown) and finally transmitted to the scanline computer 12.

The scanline computer 12 uses the information transmitted from the geometric processor 10 to determine which faces are occulted and which faces are to be displayed on the display 16. In particular, the scanline computer 12 works on edge "intersections" and, as its name suggests, processes the edge intersection information serially, one display scanline at a time. Since the displayed image is generated scanline by scanline, this scanline based DIG system performance is in part limited by its ability to handle the most complex scanline. That is, the scanline based DIG is limited by a maximum number of edge intersections per scanline to produce an acceptable displayed image.

The output of the scanline computer 12, then, is a list of intersections for each scanline with the information for displaying the visible faces. This information includes the intensity, the color and (if appropriate) the parameters for smooth shading and atmospheric fading of the displayed image.

The output of the scanline computer 12, as may be observed in the processor shown in FIG. 1, provides an input for the video generator 14. In the video generator 14, the information for displaying the visible faces, which is supplied by the scanline computer 12, is transformed into picture-element-by-picture-element (i.e. pixel) information. In sum, the video generator 14 transfers the pixel information into a digital format that corresponds to the intensity of each displayed pixel. Finally, the video generator 14 provides a mechanism so that the digital pixel information may be converted into an analog electrical voltage or video signal which can be used to drive, in a raster format, the display 16.

The display 16 may include a conventional projector or TV-like cathode-ray tube (CRT). A typical CRT display encompasses a succession of equidistant scan lines, where each scan line is made up of pixels. The CRT constructs a displayed image by interlacing two separate "fields", where one field contains even-numbered scan lines and the other field contains odd-numbered scan lines. The interlaced fields are also called a "frame".

The basic operation of the scanline based DIG shown in FIG. 1 has now been set forth. Although this particular architecture provides an important advance in the art of computer image generation for flight simulation, it does not, as established above, fully satisfy the aforementioned design objectives. Notably, as indicated above, the scanline based DIG performance is limited in its ability to handle the most complex scanline. The limitation is due to the time available to process a scanline while maintaining synchronism with the display. This insufficiency leads to scanline overloads. In addition, this system has only a limited capability to suppress aliasing and popping.

The scanline based architecture of the DIG shown in FIG. 1 makes it difficult, moreover, to expand the basic system configuration from a single channel (or single view) system to a multi-channel system, without degrading the quality of the displayed image. Also, the architecture of this DIG makes it difficult to readily and inexpensively incorporate a texture and translucency capability.

The cited insufficiencies of the present DIG system architecture, as typified by the scanline based architecture shown in the DIG of FIG. 1, suggests that a need exists for a new DIG system architecture. The present invention provides such a new DIG system architecture that addresses the cited problems and improves upon the prior art digital image generators.

The new DIG system architecture of the present invention is a modular (or parallel) architecture of the type discussed, in general, in the article "A New Visual System Architecture" by R. A. Schumacker in Proceeding of 2nd Interservice/Industry Training Equipment Conference, November, 1980. The benefits of this new modular architecture include a closer adherence, than heretofore possible, to the design objectives described above. In particular, the benefits are realized because the modular architecture of the present invention is not limited in performance by a maximum number of scanline edge intersections. Additionally, the incorporation of translucency and texture capabilities as well as expansion to a multi-channel system, are readily and inexpensively realized by the modular architecture of the present invention. Finally, the apparatus of the present invention provides the desired realism that enables the trainee pilot to interpret varied, complex and frequently subtle visual cues.

DISCLOSURE OF THE INVENTION

Accordingly, a primary object of the present invention is to provide a digital image generator that is capable of producing visual images.

It is a feature of the present invention to employ a modular architecture in the design of the digital image generator.

These attributes of the present invention are realized by providing a digital image generator that includes a geometric processor. The geometric processor processes a plurality of prioritized faces which comprise an image that is to be displayed and provides, moreover, tonal and geometric information for each of the faces.

The digital image generator also includes at least one video processor connected to the geometric processor. The video processor comprises a vertical integrator which updates the geometric information for each of the faces to determine a set of candidate sample areas for further processing. A skip over logic device, connected to the vertical integrator, identifies sample areas to be further processed and provides this information, in the form of an address location, to a tonal integrator and to a Bed of Nails (BON) device.

A tonal integrator, connected to the geometric processor, uses the tonal information supplied by the geometric processor to compute an intensity (I) of an identified sample area, for subsequent input to a video mixer.

The video processor further includes a Bed of Nails (BON) device that is connected to the skip over logic device. The BON device provides quantization of an identified sample area to a subpixel resolution level, where the quantization corresponds to the subpixel areas that are covered by a face within the convolution base of an identified sample area. The BON device provides, moreover, a logical difference of the subpixel areas of a new face minus the subpixel areas of all of the previously processed faces, at an identified sample area, for input to a spatial filter. The BON device additionally provides a logical union of the subpixel areas of all of the previously processed faces with the subpixel areas of a new face, at an identified sample area, for input to the skip over logic device upon the detection that the subpixel areas encompass a predetermined area.

The video processor also includes a spatial filter, connected to the BON device, which provides the characteristics for quantization of an identified sample area. The spatial filter, moreover, generates a number that corresponds to a fractional area encompassed by the logical difference outputted by the BON device, which number is subsequently inputted to a video mixer.

The video processor additionally includes a video mixer which is connected to the spatial filter and to the tonal integrator, that functions firstly to multiply the intensity (I) of an identified sample area times the number outputted by the spatial filter, to produce a resultant intensity ($I_O$) of an identified sample area, and secondly, to add the resultant intensity ($I_O$) to a previously stored value ($I_{stored}$) of the resultant intensity, retrieved from a frame buffer memory, to produce an updated value of ($I_{stored}$). The updated value of ($I_{stored}$) is inputted to the frame buffer memory.

Finally, the video processor includes a frame buffer memory that is connected to the video mixer and which stores cumulatively updated values of ($I_{stored}$) for each sample area, for a field's worth of displayed imagery.

The digital image generator, finally, includes a digital to analog converter, connected to the frame buffer memory, that converts quantized information stored in the frame buffer memory into an analog format, for input to a display, and, a display connected to the digital to analog converter.

BRIEF DESCRIPTION OF THE DRAWINGS

These and other features of the present invention will be more clearly understood from a consideration of the following description taken in connection with the accompanying drawings in which:

FIGS. 6a-6d provide a diagramatic representation of the processing of a plurality of faces that comprise an image, according to the principles of the present invention;

FIG. 8 is a logic diagram of the skip over logic device;

FIGS. 9a-9c illustrate the operation of a portion of the logic diagram shown in FIG. 8;

BEST MODE FOR CARRYING OUT THE INVENTION

Figure 2:
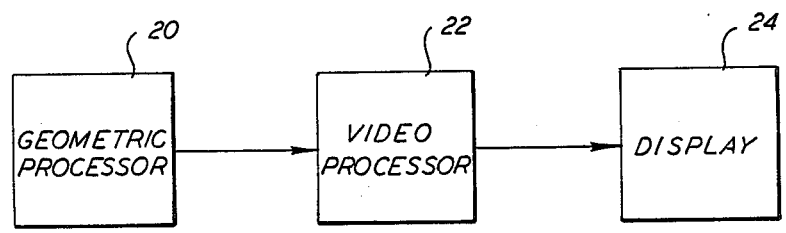
FIG. 2 shows a block diagram of a DIG constructed in accordance with the present invention.

Reference is now made to FIG. 2 which shows a block diagram of the modular DIG of the present invention. As shown in FIG. 2, the modular DIG includes a geometric processor 20, a video processor 22 and a display 24.

Figure 1:
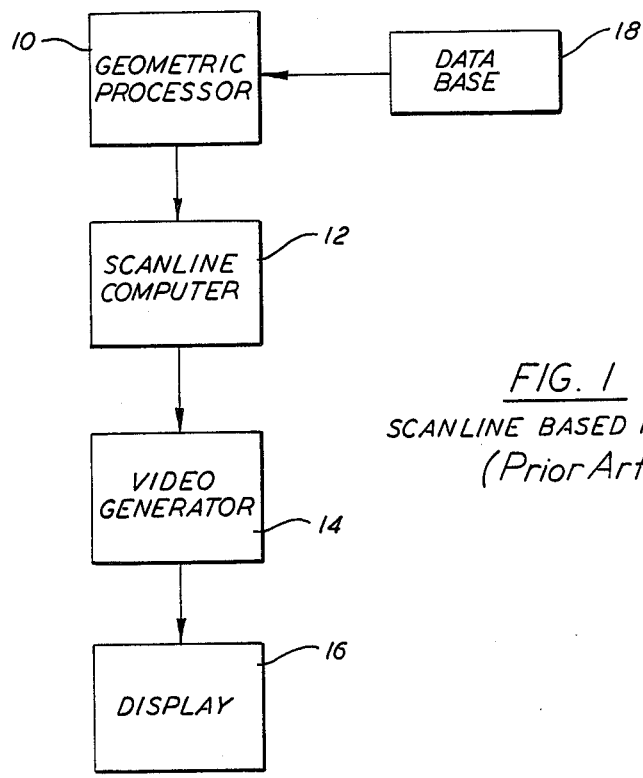
FIG. 1 shows a block diagram of a prior art scanline based DIG processor.

A comparison of FIGS. 1 and 2 reveals that the scanline computer 12 and video generator 14 included in the prior art processor shown in FIG. 1 are replaced by the video processor 22 of the modular DIG. The scanline based processor and the modular DIG are similar, however, in that each may employ a geometric processor and a display of the type described above in the Background Art. Hence, the geometric processor 20 operates in a manner similar to that of the scanline based geometric processor 10 and functions to compute the geometric and tonal (e.g. shading and fading) descriptions of faces of objects as projected onto the display 24.

In a preferred embodiment of the present invention, the geometric processor 20 computes the description of faces of prioritized objects, as indicated, and provides this information to the video processor 22 in a prioritized order.

Figure 3A:
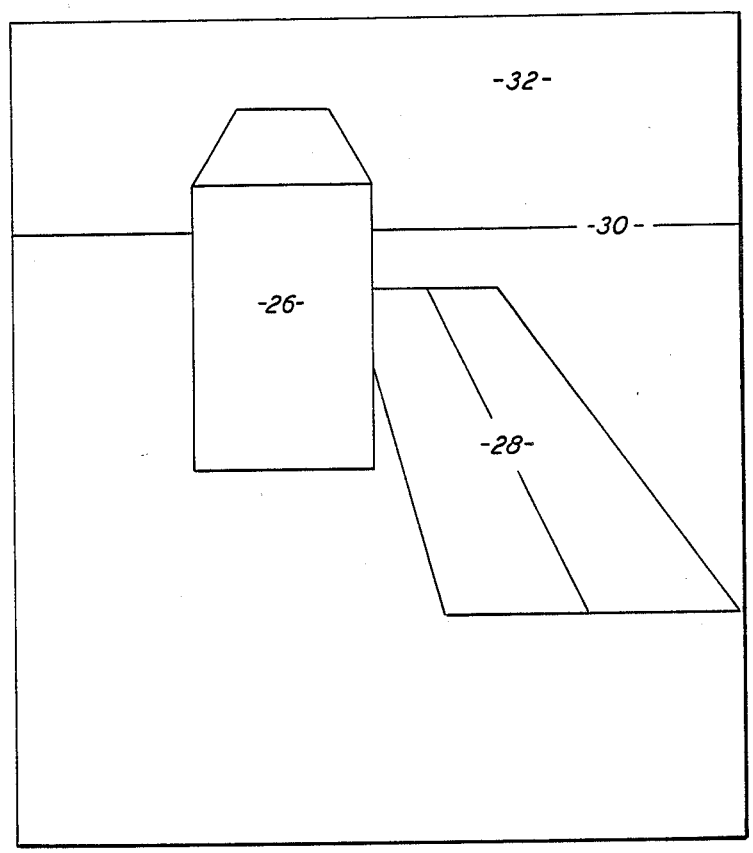
FIGS. 3a-3c provide a pictorial representation of processing in high to low priority order of occultation, as employed in the present invention.
Figure 3B:
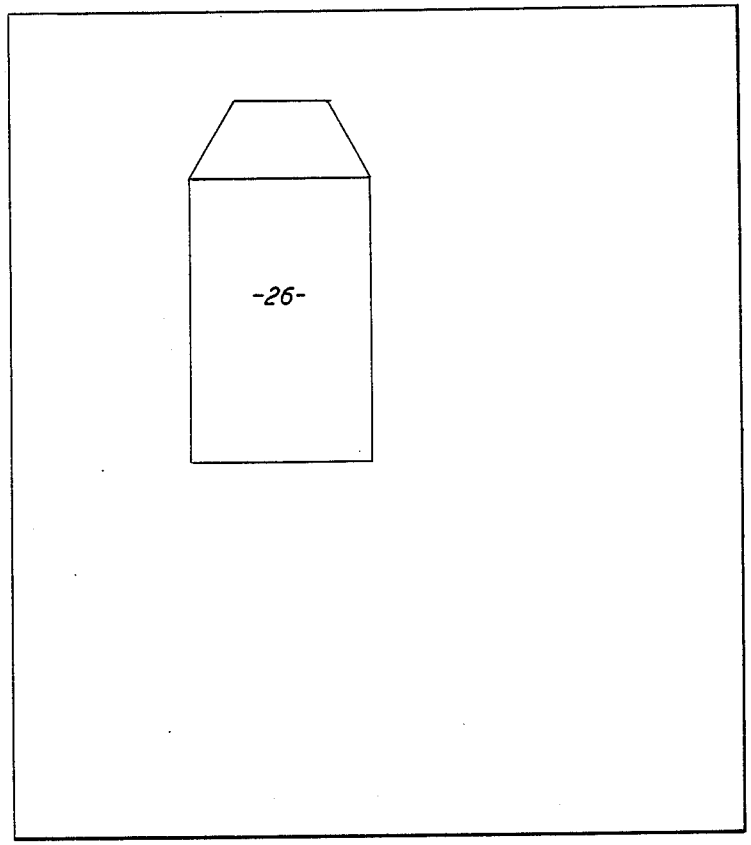
Figure 3C:
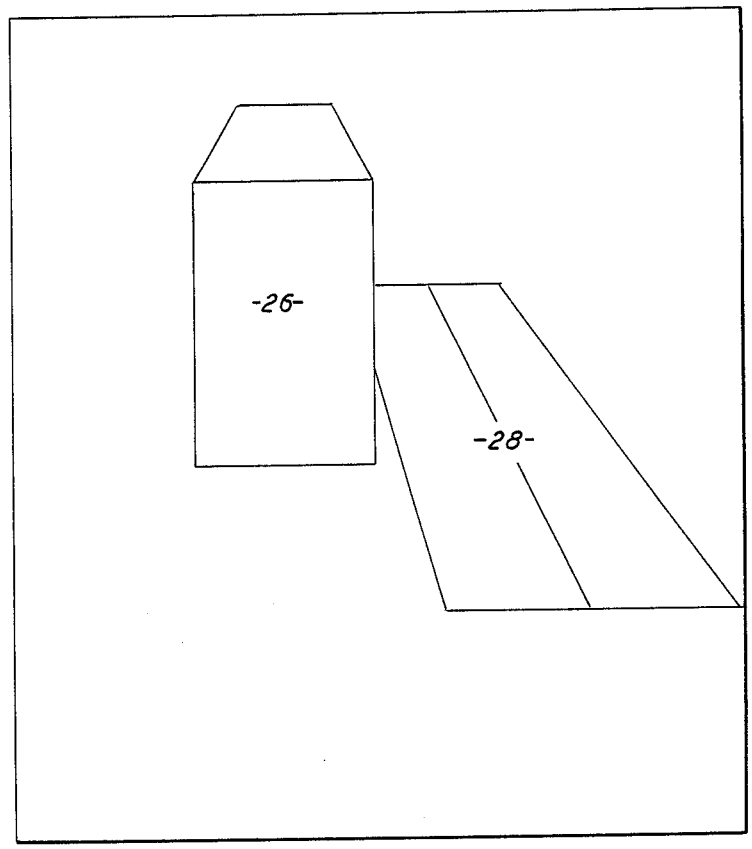

In the present invention, the objects are processed in a prioritized order, as defined by way of the pictorial example set forth in FIGS. 3a through 3c. Specifically, unocculted objects are processed first, followed by objects in order of occultation. Thus, assume that a simple scene that includes a building 26, a runway 28, a ground plane 30, and a sky 32, as shown in FIG. 3a, is to be processed by the video processor 22. Since in this example the building 26 is determined to be unocculted by other objects from the viewpoint of the trainee pilot, it is assigned the highest priority. In consequence, the video processor 22 first processes a scene that includes only a building (see FIG. 3b). Continuing the example, the runway 28 is determined to be the next object in order of occultation presented to the eye of the trainee pilot. In consequence, the video processor processes the scene shown in FIG. 3c, which shows the building 26 plus the runway 28 as a combination. However, it is noted that the video processor 22 only processes the visible portion of the runway. That is, that part of the runway 28 which is occulted by the building is detected and consequently "skipped over" by the processing apparatus of the video processor 22. Finally, in a similar manner, the ground plane 30 and sky 32 are assigned a priority listing and processed by the video processor 22 to the extent that there are visible portions of the faces of these objects that are not otherwise occulted by the aforementioned runway 28 and/or building 26. A suitable priority algorithm that ensures that the video processor 22 is able to process faces of objects in order of occultation is set forth in the article "A Characterization of Ten Hidden Surface Algorithms" by I. Sutherland et al in Computing Surveys, Vol. 6 No. 1. May 1974, pp 1-55.

The modular DIG of the present invention includes, in summary, a geometric processor 20 which processes faces in a prioritized order, a video processor 22 and a display 24. The video processor 22 interfaces with the geometric processor 20 and receives geometric and tonal information which describes the faces to be processed for each frame of displayed video imagery. The video processor 22 receives this information, moreover, in a prioritized order so that it can process faces one at a time, starting from the highest priority face.

Figure 4:
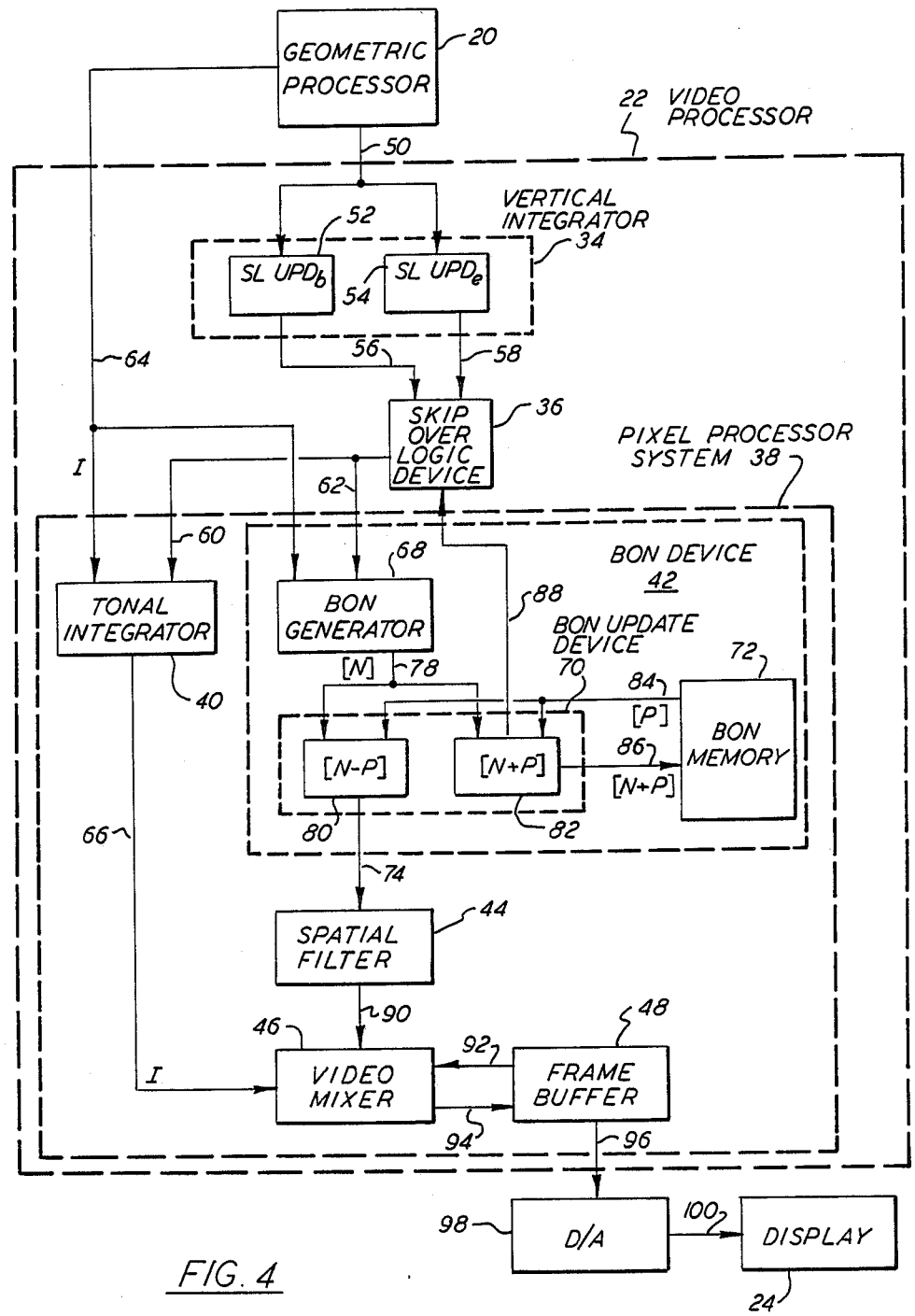
FIG. 4 shows a detailed block diagram of a DIG constructed in accordance with the present invention.

Further details on the structure of the video processor 22 are provided by inspection of FIG. 4. In particular, the video processor 22 includes a vertical integrator 34, a skip over logic device 36, and a pixel processor system 38. The pixel processor system 38, in turn, includes a tonal integrator 40, a "bed of nails" or BON device 42, a spatial filter 44, a video mixer 46, and a frame buffer 48. In order to facilitate an understanding of the operation of the video processor 22 shown in FIG. 4, the following illustrative example is set forth. Thus, in this example, the video processor 22 processes one field (the even field) of displayed video imagery that includes a first convex polygon (face A) that partially occludes a second convex polygon (face B), as shown in FIG. 5a.

Figure 5A:
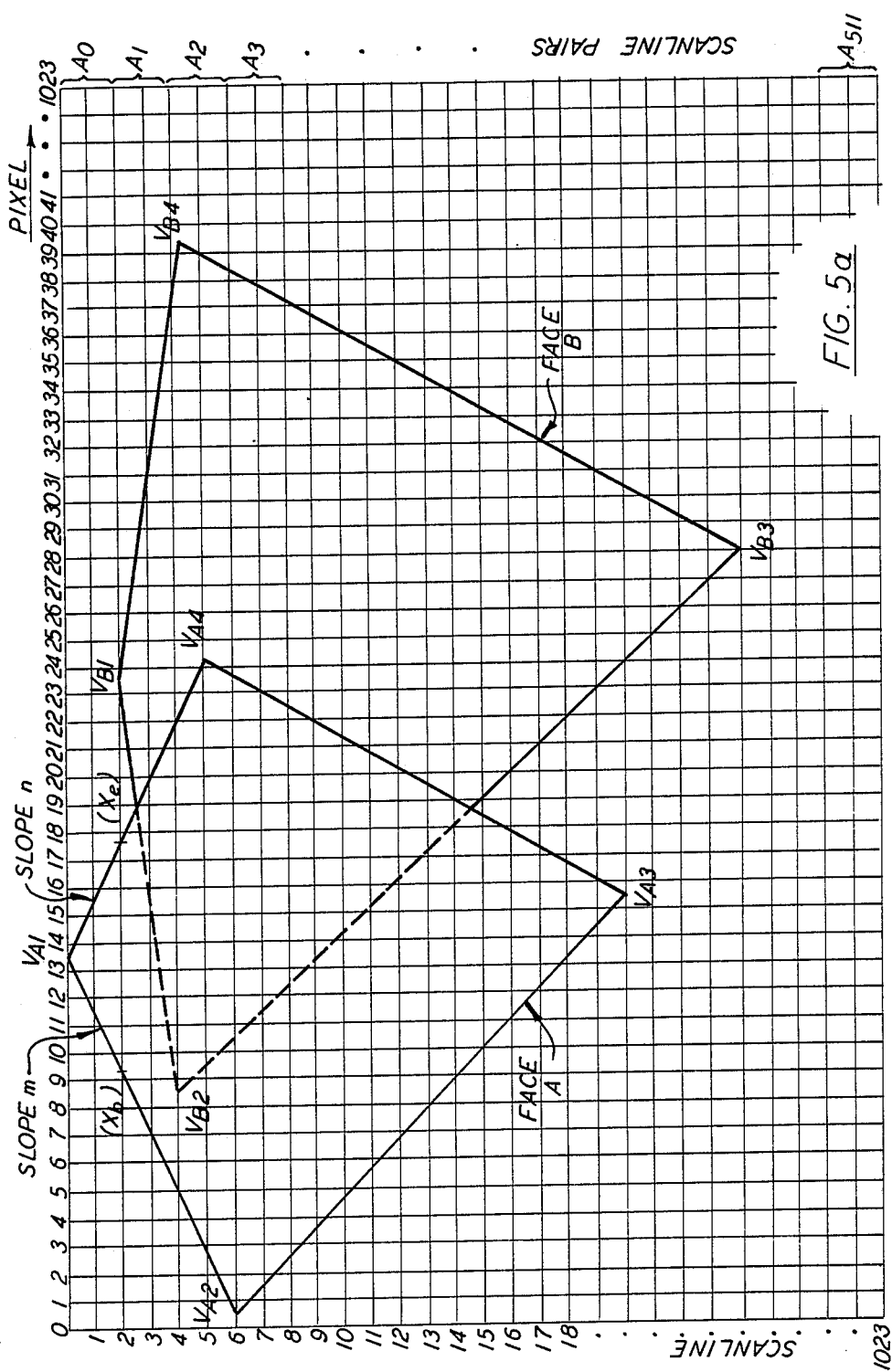
FIGS. 5a-5g provide a diagramatic representation of the characteristics of spatial filtering employed in the present invention.

More particularly, FIG. 5a shows that face A is defined by a set of vertices $\{V_{a1}, V_{a2}, V_{a3}, V_{a4}\}$ and by a set of beginning edges $\{(V_{a1}, V_{a2}), (V_{a2}, V_{a3})\}$ and by a set of ending edges $\{(V_{a1}, V_{a4}), (V_{a4}, V_{a3})\}$. Similarly, face B is defined by a set of vertices $\{V_{b1}, V_{b2}, V_{b3}, V_{b4}\}$ and by a set of beginning edges $\{(V_{b1}, V_{b2}), (V_{b2}, V_{b3})\}$ and by a set of ending edges $\{(V_{b1}, V_{b4}), (V_{b4}, V_{b3})\}$. Both faces A and B, in turn, are referenced to a cartesian coordinate system wherein the "X" axis includes a pixel set that is numbered from 0 through 1023, and wherein the "Y" axis includes a scanline set that is numbered from 0 through 1023. As further shown in FIG. 5a, the scanline set is conveniently subdivided into a "scanstripe" set where each scanstripe is a pair of scanlines, $A_0$ through $A_{511}$.

The video processor 22, accordingly, interfaces with the geometric processor 20 and receives, firstly, geometric and tonal information which describes the face which is assigned the highest priority listing by the priority algorithm. In our example, this face is face A because, as set forth above, face A is determined to be unocculted from the viewpoint of the trainee pilot. In particular, then, the geometric processor 20 transmits the following geometric information to the video processor 22 along a line 50: the vertex $V_{a1}$ located at the intersection of the pixel 13.5 and the scanline 0 i.e. (13.5,0); the slope, m, of the beginning edge $(V_{a1}, V_{a2})$ and the slope, n, of the ending edge $(V_{a1}, V_{a4})$.

The vertical integrator 34 is the first component in the video processor 22 to act on this received geometric information. As shown in FIG. 4, the vertical integrator 34 includes two major components—a scanline update device 52 that acts on beginning edges, and a scanline update device 54 that acts on ending edges.

The scanline update device 52 receives the information that the vertex $V_{a1}$ of the face A is located at (13.5,0) and that the beginning edge $(V_{a1}, V_{a2})$ has a slope m. On the basis of this information, the scanline update device 52 functions, as its name suggests, to update the information as to what intersection point $(X_b)$ is defined by the beginning edge $(V_{a1}, V_{a2})$ at the left most X value in the first scanstripe pair $A_0$. In our example, this intersection point is (9.3,2), and it is shown by a hatch mark in FIG. 5a.

In a similar manner, the scanline update device 54 receives the information that the vertex $V_{a1}$ of face A is located at (13.5,0) and that the ending edge $(V_{a1}, V_{a4})$ has a slope n. On the basis of this information, the scanline update device 54 functions as its name suggests, to update the information as to what intersection point ($X_e$) is defined by the ending edge ($V_{a1}$, $V_{a4}$) at the rightmost value of the first scanstripe pair $A_0$. In our example, this intersection point is (17.9,2), and it is also shown by a hatch mark in FIG. 5a.

The vertical integrator 34 through its scanline update devices 52 and 54 provides, therefore, the beginning edge ($X_b$) parameter and the ending edge ($X_e$) parameter through lines 56 and 58 respectively, to the skip over logic device 36, as shown in FIG. 4. The skip over logic device 36, in turn, determines which set of pixels between $X_b$ and $X_e$ are crossed or covered by face A within a scanstripe pair, and which of these pixels have previously been completely covered by a higher priority face so that they need not be further processed.

Figure 5E:
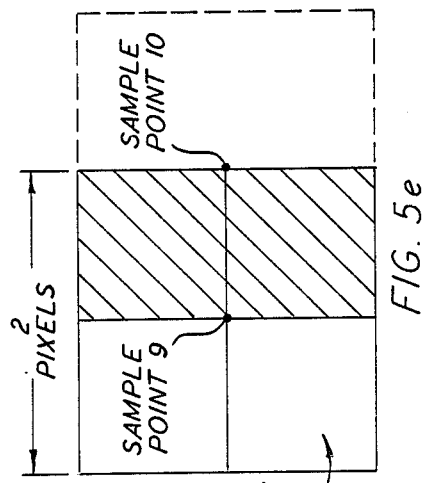
Figure 5B:
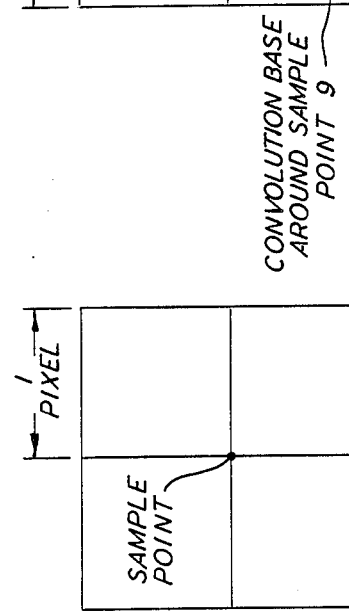

The set of pixels that are totally or partially covered by face A, on the other hand, define a set of sample points which are candidates for further processing. As shown in FIG. 5b, any one sample point is affected by four surrounding pixels. If any of the four pixels are intersected by face A, then the sample point is a candidate for further processing.

The skip over logic device 36, consequently, takes the candidate sample points 9 through 18, in our example, and makes a decision for each sample point as to whether or not the face is visible or non-occulted. The skip over logic device 36 functions to provide the pixel processor system 38 with the information only as to which sample points are visible. Those sample points, on the other hand, which are determined by the skip over logic device 36 to be non-visible or occulted, are "skipped over" by the processing apparatus of the pixel processor system 38.

In our example, therefore, the skip over logic device 36 provides the pixel processor system 38 with the information that all the sample points 9 through 18 are to be further processed, since all of these sample points are visible. (It is clear that all of the sample points of the face with the highest priority, in this case face A, must be visible since there is, by definition, no face with a higher priority that can occult face A.)

Accordingly, the skip over logic device 36 provides the pixel processor system 38 with the information that the sample points 9 through 18 are to be further processed. In particular, this information is conveyed in a sequential manner (i.e. first sample point 9, then sample point 10, then sample point 11 etc) along lines 60 and 62 respectively, to the following two components of the pixel processor system 38—the tonal integrator 40 and the bed of nails or BON device 42.

The tonal integrator 40 receives from the geometric processor 20 along a line 64, tonal information that includes, in the general case, such information as the intensity, color, shading, texture and fading parameters for each sample point that is to be processed. The tonal integrator is shown in FIG. 4 as having an intensity component I for each sample point, that is both inputted along the line 64 and outputted along a line 66 to the video mixer 46.

Continuing, therefore, the skip over logic device 36, as indicated above, also provides in a sequential order the sample points to be processed by the BON device 42. As shown in FIG. 4, the BON device 42 includes a BON generator 68, a BON update device 70, and a double buffered BON memory 72. The BON device 42 exchanges information with the skip over logic device 36, and also outputs information along a line 74 to the spatial filter 44.

It is the intent of the BON device 42 plus spatial filter 44 combination to provide apparatus that enables the modular DIG architecture of the present invention to incorporate an antialiasing scheme that significantly improves the displayed image quality, as compared to prior DIG architectures. The combination also provides apparatus that enables the video processor 22 to make a decision on whether or not faces are visible or nonocculted at a subpixel resolution level.

To this end, a preferred embodiment of the present invention employs a 2×2 spatial filter. Other embodiments (not shown), for example, a 1×1 spatial filter or a 3×3 spatial filter may alternatively be readily employed and implemented by those skilled in this art. A discussion of the background materials that are pertinent to this aspect of the present invention may be found in the textbook by Pratt called "Digital Image Processing", John Wiley and Sons, 1978.

Figure 5G:
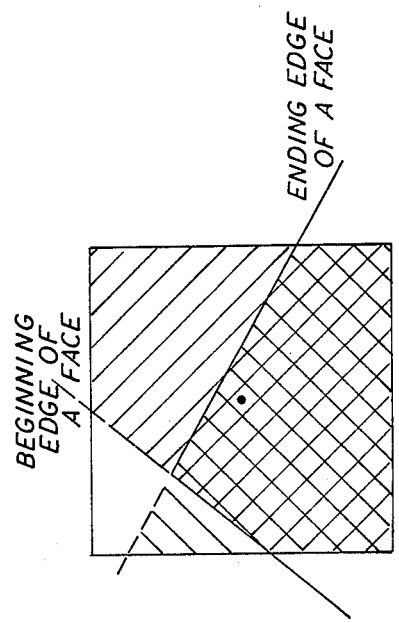
Figure 5F:
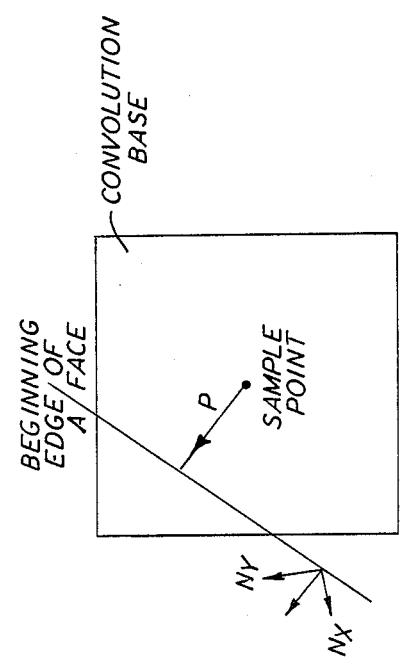
Figure 5C:
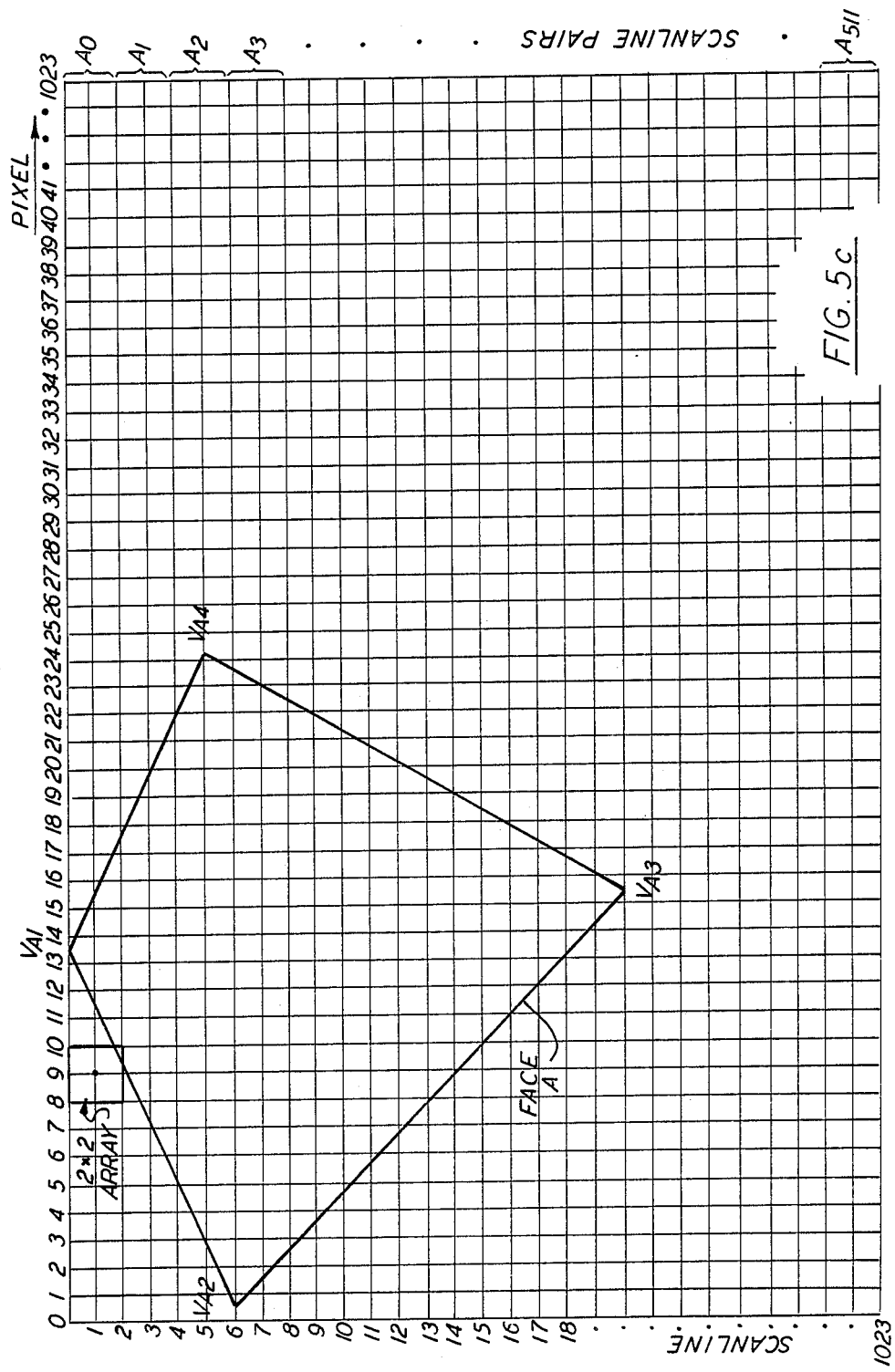

The explanation of the operation of the BON device 42 plus 2×2 spatial filter combination of the present invention is now made with reference to FIG. 5c and to our ongoing example. FIG. 5c is basically a reproduction of FIG. 5a, but shows the sample point 9 that is to be processed by the BON device 42 and 2×2 spatial filter combination. For purposes of the present invention, a sample point is further defined to be at the geometric center of a convolution base or sample area. In particular, for a 2×2 spatial filter (and hence a 2×2 convolution base), the convolution base or sample area corresponds to a 2×2 pixel array with the center at the sample point. In FIG. 5c, in consequence, a 2×2 array of pixels is blocked off around the center of the sample point 9.

Figure 5D:
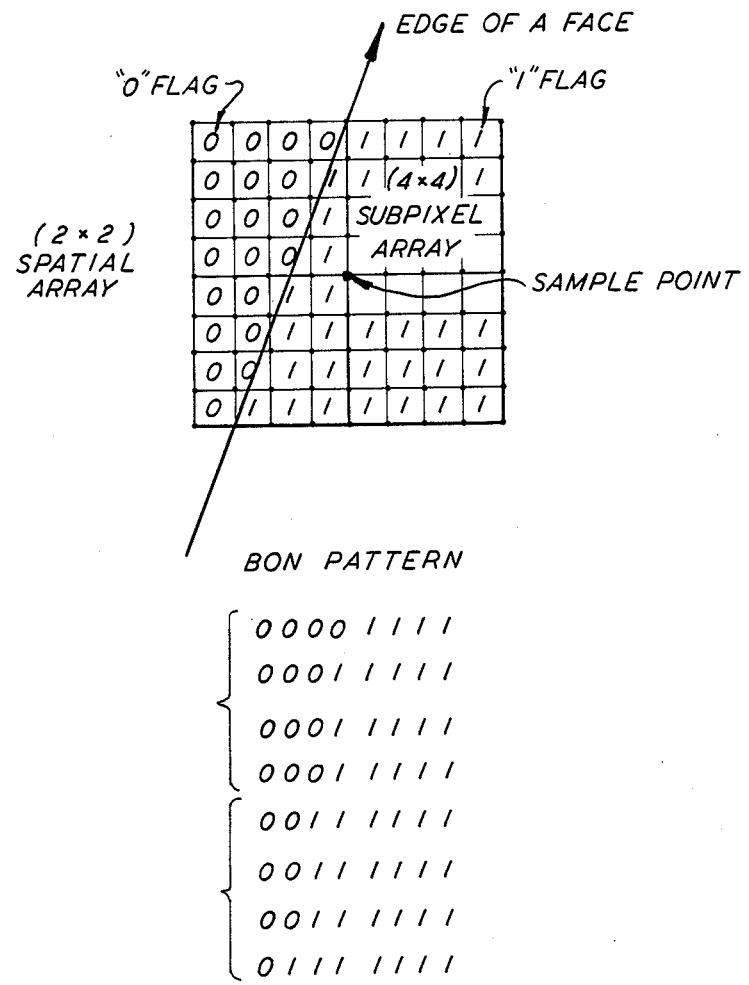

Attention is now focused on FIG. 5d which shows an enlarged view of the 2×2 array of pixels that surround an arbitrary sample point. In the enlargement, each portion of one pixel has been subdivided or quantized into a 4×4 array of subpixels. In essence, the 4×4 array of subpixels corresponds to a fractional picture element. In order to keep a quantitative record of how much of a fractional picture element is employed in processing a sample point, it is convenient to associate a "flag bit" for each subpixel. For purposes of the present invention, this array of flag bits is called a bed of nails (BON). Altogether therefore, the BON of the 2×2 spatial filter includes 64 nails, since each of the 4 pixels in the 2×2 array contributes 16 nails.

The bed of nails of a face on the convolution base of a sample point is computed as follows. Conceptually, a nail is positioned at the center of a subpixel area. Hence, for each nail at each subpixel, there is a corresponding flag bit which is turned on (i.e. logic bit 1) if the face is pierced by the nail. Conversely, the flag bit is turned off (i.e. logic bit 0) if the face is not pierced by the nail. An example of a bed of nails pattern for the convolution base of the indicated sample point is shown illustratively by way of FIG. 5d.

Although a preferred embodiment of the present invention shows the nails at the center of the 16 square regular grids, in alternative embodiments of the present invention (not shown), the bed of nails is distributed according to a more irregular or random structure which exhibits no directional preference. Moreover, the quantization interval of the nails is not restricted to 16 per pixel, but is increased in number to e.g. 32 or 64. These alternative embodiments provide better antialiasing results. Conversely, fewer nails may be used for reasons of economy, although this is done at the expense of aliasing.

Returning to FIG. 4, the present invention employs the BON generator 68 which functions to generate a sequence of bits (zeros and ones) which correspond to the bed of nails. In the example shown in FIG. 5c, the BON generator 68 generated a 64 bit BON pattern of zeros and ones, where the zero corresponds to the fact that a zero fraction of the pixel is occupied by the face and where a one corresponds to the fact that a fraction of the pixel is occupied by the face.

The BON generator 68, then, generates the bed of nails and inputs this information along a line 78 to the BON update device 70. As shown in FIG. 4, the BON update device 70 includes an [N−P] block 80 and an [N+P] block 82. Here, the [N] signifies a BON (that is, the 64 nail matrix) of a "new" face that is inputted to the BON update device 70 along the line 78. The [P], on the other hand, signifies a BON (that is the 64 nail matrix) of a "previous" face which has previously been stored in the BON memory 72 and is currently inputted along a line 84 to the BON update device 70.

The [N−P] block 80 performs a logical function which corresponds to the visible portion of [N], that is, the logical difference between the BON patterns of a previous and a new face. Similarly, the [N+P] block 82 performs a logical function which corresponds to the nails covered by the new and the previous faces, which is the logical union of the BON pattern of the previous and new face. The output of the [N−P] block 80, in turn, provides an input along the line 74 to the spatial filter 44, while the output of the [N+P] block 82 provides an input along a line 86 to the BON memory 72 and an input along a line 88 to the skip over logic device 36.

The operation of the BON update device 70 is clarified by tracing through its operation in conjunction with our example. At the start of each field the BON memory 72 is initialized to all zeros. Since there is no previous face so far, but only a "new" face A, the BON pattern for the previous face is all zeros. The BON pattern for the new face A is in fact the BON pattern that has just been generated by the BON generator 68. Consequently, for this case, the [N−P] block 80 output is simply [N−P]=[N], and the [N+P] block output is simply [N+P]=[N]. Accordingly, for this example, the BON pattern [N] is provided as an input to the BON memory 72 along the line 86, and the spatial filter 44 along the line 74. Note that when [N+P] contains all ones, detection apparatus (not shown) provides this information to the skip over logic device 36 along the line 88.

The spatial filter 44, accordingly, receives the BON pattern [N−], in the general case, and functions to count the bits in the BON pattern and to provide the fraction of the area covered by the visible portion of the face in the vicinity of the sample point currently being processed. In the example shown in FIG. 5d the BON pattern has a count 44 that corresponds to a fractional area of 44/64. The spatial filter provides the information on the computed fractional area to the video mixer 46 along a line 90.

In order to simplify the preceeding discussion on the operation of the spatial filter 44, it has been assumed that each of the subpixel areas contribute to the sample point with equal weight. However, in alternative embodiments of the present invention (not shown), the weighting coefficients associated with the nails monotonically decrease away from the sample point. Since the weighting coefficients monotonically decrease away from the sample point, the scene elements that are near to the sample point are emphasized more than those scene elements which are further away from the sample point. The effect of the employment of weighting coefficients is to provide a "sharp" spatial filter. In order to implement a sharp spatial filter, a look up table is provided which specifies distinct weighting coefficients which are to be assigned to each nail in the bed of nails.

As indicated above, the output of the spatial filter 44 is inputted along the line 90 to the video mixer 46. This input, in our example, is the fraction 44/64 which corresponds to a fractional subpixel area that is encompassed by the intersection of an edge within the vicinity of a sample point currently being processed. As shown in FIG. 4, the video mixer 46 also receives along the line 66 the information outputted by the tonal integrator 40. This information, in our example, is the intensity parameter, I. The video mixer 46 functions to multiply the intensity parameter (I) outputted by the tonal integrator 40 by the fraction outputted by the spatial filter 44. The product corresponds to a resultant intensity ($I_o$) which is the contribution of face A to the currently processed sample point.

The resultant intensity ($I_o$) parameter that is computed by the video mixer 46 is further processed through the interaction of the video mixer 46—frame buffer 48 combination. The frame buffer 48, in particular, is a double buffered memory that stores the output of the video mixer 46 for each sample point processed by the pixel processor system 38. The successive contributions of faces to a pixel are accumulated by the video mixer for storage in the frame buffer. A cumulative value is called $I_{stored}$.

The video mixer 46—frame buffer 48 combination operates as follows. Before the processing of each field, the frame buffer 48 is initially cleared to contain a value of $I_{stored}=0$. Once the video mixer 46 computes a particular value $I_o$ for the resultant intensity (upon the processing of a particular sample point), the video mixer 46 reads along a line 92 the previously stored value of the resultant intensity (of that sample point) contained in the frame buffer 48 memory. (In this illustration, the video mixer 46 reads a previously stored value of $I_{stored}=0$.) The video mixer 46 adds the resultant intensity $I_o$ parameter, to produce a new value for $I_{stored}$. Finally, the newly computed value of $I_{stored}$ is written along a line 94 back into the frame buffer 48 memory.

With this step, the contribution of the face A to the sample point (9, in our ongoing example) has been completed by the pixel processor system 38. Accordingly, the skip over logic device 36 provides the pixel processor system 38 with the information that the next sample point (10) is to be processed. This processing is done in a manner that is substantially the same as that just outlined above for the sample point 9. However, one important difference is the following. By examining FIG. 5e, it is noted that the convolution base for the sample point 10 overlays the convolution base for the sample point 9. Thus, the BON computed for the sample point 9 in the overlapped area (indicated by cross marks in FIG. 5e) can be employed in the computation of the BON for the sample point 10. In effect, this means that a computation of the BON for the sample point 10 only requires a determination of that portion of the convolution base of the sample point 10 that has not been overlapped by the convolution base of the sample point 9. It is noted in this regard that the "sharing" process that arises in the computation of the BON for the sample point 10 is in fact a general phenomenon since the sharing process is employed in the computation of the BON of a face for all identified sample points.

Upon the conclusion of the processing of the sample point 18, the vertical integrator 34 provides a scanline update so that the scanstrip pair $A_1$ in our example can be processed. Again, in a manner substantially the same as that outlined above, the vertical integrator 34 and the skip over logic device 36 determine a set of sample points for the scanstripe pair $A_1$, which are then processed by the pixel processor system 38 in a manner that again is substantially the same as that set forth above for the scanstripe pair $A_o$.

Upon the conclusion of the processing of the last sample point in the scanstripe pair $A_1$, the vertical integrator 34 provides a scanline update so that the sample points in the scanstripe pair $A_2$ can be processed. The vertical integrator 34 continues to provide a scanline update (with all of the intervening steps which are performed by the pixel processor system 38 repeated for each scanstripe pair) until it reaches the last scanstripe pair for the last set of beginning and ending edges that define the first face A.

Once the last sample point in the last scanstripe pair that is defined by the last set of beginning and ending edges of the first face A is processed, the video processor 22 begins to process the face B. In order to generalize the explanation of this operation, attention is focused on FIG. 6a which shows face A intersecting face B. At this point in the example, face A is assumed to be entirely processed.

From the explanation set forth above on the processing of sample points for face A, note that for the first scanstripe defined for face B, (the scanstripe $A_1$) there are 31 candidate sample points to be processed. The first sample point to be processed for face B is the sample point 8 (SP 8). In the convolution base of the sample point 8, face B is totally occluded (TO) by face A. Although in the convolution base of the sample point 8 (like the sample points 9 and 10) face B is totally occluded by face A, it must be processed by the pixel processor system 38. The reason that this sample point must be processed, although totally occluded, is because this sample point, when processed earlier for face A, did not entirely cover the 64 nails alloted to that sample point.

In consequence, the pixel processor system 38 processes the sample points 8 through 10 as defined by face B. It is noted, in this regard, that in the BON update device 70, the [N−P] block 80 effectively computes the logical difference between the BON pattern of the previous face (face A) and the new face (face B), and inputs this difference to the spatial filter 44. In particular, the BON pattern [N−P] that corresponds to this logical difference is [N−P]=[0] for each of the sample points 8 through 10. This matrix of zeros indicates that at these sample points, face B does not provide a contribution to the intensity of the sample points, since it is in fact totally occulted by face A.

Similarly, it is noted that the [N+P] block 82 computes the logical union of the BON pattern of the old face (face A) and the new face (face B) and inputs this sum to the BON memory 72. In particular, the BON pattern [N+P] that corresponds to this logical union is [N+P]=[P], for each of the sample points eight through ten. This matrix [P] indicates that, at these sample points, face B does not add anything new to the previous "history" of these sample points, as they have been processed so far and stored in the BON memory 72.

The sample points 11 through 17 for face B, in contrast to the sample points 8 through 10, are not currently processed by the pixel processor system 38, but are instead "skipped over" (SO) upon instruction from the skip over logic device 36. The reason that these sample points may be skipped over and not currently processed is because these sample points, when previously processed as sample points for face A, entirely covered the 64 bed of nails array alloted to each of the sample points. This information, as was explained above, was computed by the [N+P] block 82 and sent along the line 88 to the skip over logic device 36. The skip over logic device 36, therefore, was provided with the information as to which sample points were entirely processed (i.e. all 64 nails covered). The skip over logic device 36 acts on this information, accordingly, and functions to skip over sample points that have already been entirely processed.

The sample point 18 for face B is totally occluded by face A, but it is not skipped over for current processing since the sample point 18, when processed for face A, did not utilize all 64 nails alloted to sample point 11. In consequence, sample point 19 is currently processed by the pixel processor system 38 in the same manner as e.g. the sample points 8 through 10 of face B are processed.

Figure 6A:
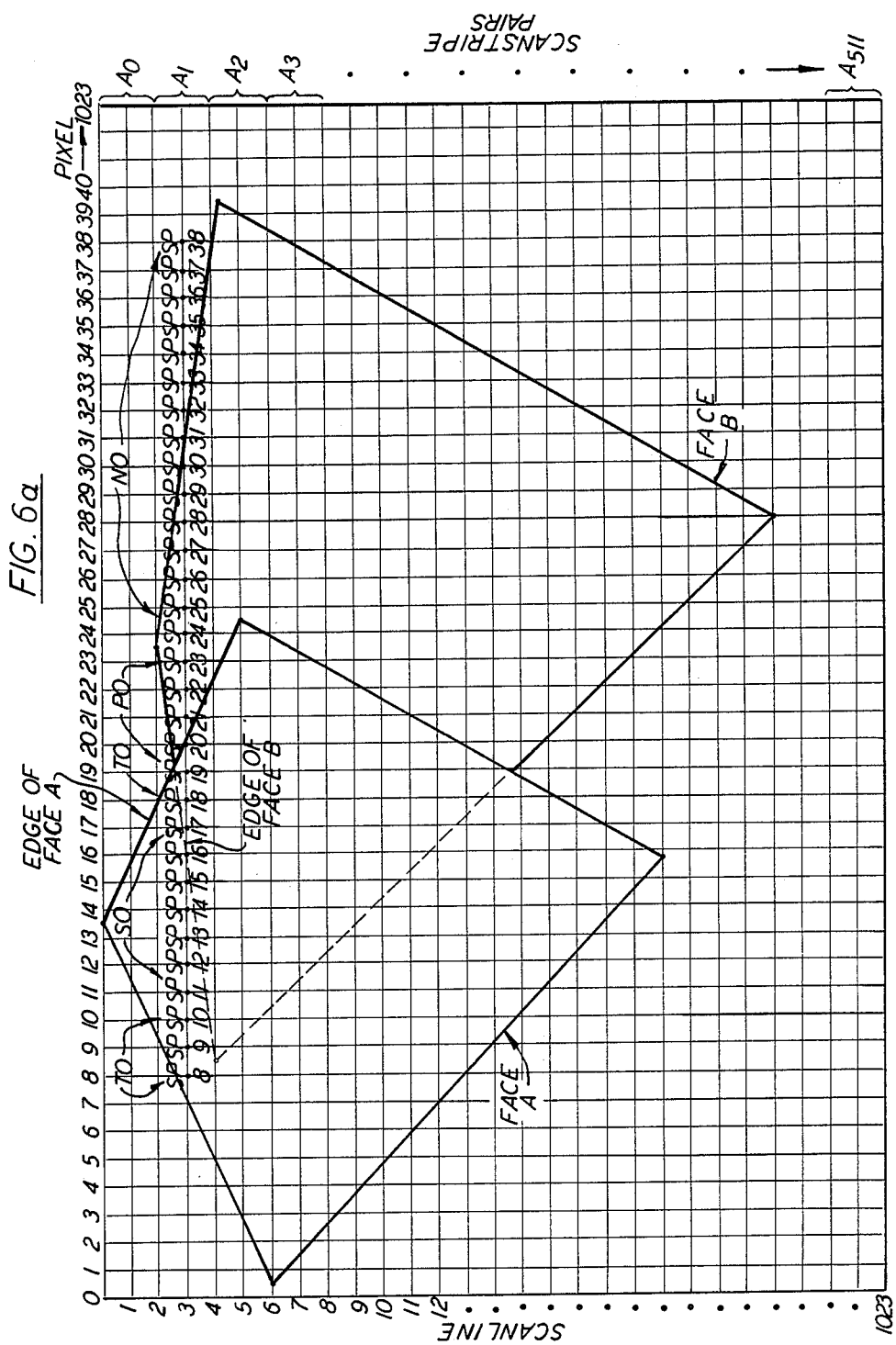

The sample points 19 through 23 are only partially occluded (PO) by face A and therefore must be processed in a manner that is analogous to that of the processing of the sample points 8 through 10 and 18 for face B. The fact that sample point 19 (in particular) is partially occluded is readily ascertained by examining FIG. 6b. FIG. 6b is an enlargement of FIG. 6a and shows in detail the array of 64 nails (shown as dots) grouped around the sample point 19. Also shown in FIG. 6b are edges of face A and face B that intercept this array of 64 nails. Further shown in FIG. 6b is a set of hatched lines which define an area that corresponds to the subpixel areas that are encompassed by the intersection of the edge of face A alone, within the vicinity of the sample point 19.

The subpixel areas defined by face A alone and shown by the set of hatched lines, corresponds to a BON pattern of $[N+P]=[P_1]$ that does not entirely cover all the 64 nails in the convolution base. This implies that the sample point 19 must be further processed, until in fact, all 64 nails are covered. This situation, in turn, occurs through the gradual process of additional faces being processed which individually contribute to the covering of the remaining nails left in the 64 BON array.

This gradual process of adding additional faces, thus gradually covering more nails in the 64 BON array, is illustrated by the addition of face B to that of face A in the vicinity of sample point 19. Thus, FIG. 6c shows a hatched set of lines which defines an area that corresponds to the subpixel areas that are encompassed by the visible portion of face B within the vicinity of the sample point 19 (i.e. a BON indicated by $[N−P_1]$).

Note that the BON contribution of face B in FIG. 6c corresponds to a BON pattern $[N−P_1]$. This BON pattern $[N−P_1]$ represents the contribution of face B to the sample point 19 that is (1) visible and (2) has not already been covered by the BON contribution of face A. The visible contribution portion of face B to the sample point 19 [N−P₁], is, accordingly, provided as an input to the spatial filter 44 along the line 74.

Once the contribution of the visible portion of face B is accounted for, as shown in FIG. 6c, the indicated situation of gradually adding new faces to previous faces implies that, for some new face C (yet to be processed) the BON of sample point 19 is actually that depicted by FIG. 6d. FIG. 6d thus shows a hatched set of lines which defines an area that corresponds to a BON pattern [P₂] where [P₂] corresponds to the logical union of all the BON patterns of all of the previous faces (A and B). This information, it is recalled, is provided as an input along line 86 to the BON memory 72.

When, additionally, the BON pattern contributed by some new face C results in the BON pattern being all ones so that the sample point 19 is entirely covered, detection apparatus (not shown) detects this information and inputs it, as indicated above, to the skip over logic device 36 along the line 88. This information, in turn, is used by the skip over logic device 36 so that it can make the decision to skip over sample point 19, should sample point 19 be later intersected by some new face D or E etc.

Finally, by again returning to FIG. 6a, the sample points 24 through 38 are non-occluded (NO) by face A and must therefore be processed by the pixel processor system 38. Again, this processing is done in a manner that is analogous to that of the processing of the sample points 8 through 10, 18, and 19 through 23 for face B.

Upon the conclusion of the processing of the last sample point 38 in the first scanstripe pair defined for face B (the scanstripe A₁), the vertical integrator 34 provides a scanline update so that the scanstripe A₂ (in our example) can be processed. This processing is done in a manner that is substantially the same as that just outlined above for the scanstripe A₁.

Upon the conclusion of the processing of the last sample point in the last scanstripe defined by the last set of beginning and ending edges that define the face B, the even field of displayed video imagery is entirely processed. Accordingly, the even field of displayed video imagery is outputted from the double buffered, frame buffer 48 memory and is provided as an input along a line 96 to a conventional D/A converter 98. The output of the D/A converter 98, in turn, provides an input along a line 100 to the display 24. At the same time, moreover, that the even field is displayed, an odd field is processed in a manner entirely analogous to that employed to process the even field. Note that the sample point locations and scanstripes are shifted down one pixel in the odd field.

In order to provide continuity in the foregoing explanation of the operation of the present invention, a detailed explanation of the operation of the skip over logic device 36 is reserved for the present moment. In general, it is the intent of the skip over logic device 36 to skip over, for purposes of the current processing of a particular face, those areas of a display which have already been entirely processed by the pixel processor system 38.

For the skip over logic, the image area is subdivided into hierarchy of areas, namely vertical pixel pairs (corresponding to half the convolution base), blocks, and scanstripe. Thus, it is the intent of the skip over logic device 36 to skip over pixel blocks and scanstripes which are entirely processed. Equivalently, the skip over logic device 36 provides the pixel processor system 38 with a list of addresses that specifies, by scanstripe (SCP) address, block (BL) address, and, corresponding to each pixel pair, a sample area (SA) address, i.e. [SCP, BL, SA], which area is to be processed and not skipped over.

Figure 7A:
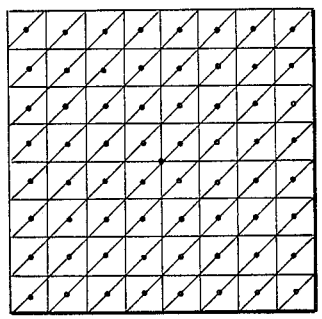
FIGS. 7a-7c provide a pictorial representation of a hierarchy of areas operated upon by a skip over logic device of the present invention.
Figure 7B:
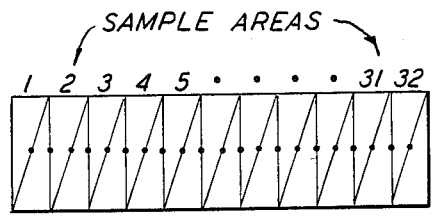

A "mask" is built up for each of the entirely processed areas in the hierarchy. Areas that have already been entirely processed include individual sample areas wherein a 64 bit Bed of Nails is entirely covered. Such an entirely covered sample area is shown in FIG. 7a. Entirely processed areas also include a plurality of entirely processed sample areas, which plurality is conveniently defined as a block of sample areas. Such an entirely covered block of sample areas is shown in FIG. 7b. In a preferred embodiment of the present invention, the block includes 32 sample areas. Finally, an entirely processed area includes a plurality of blocks of sample areas which define a scanstripe. In a preferred embodiment of the present invention shown in FIG. 7c, each of the 512 scanstripe include 32 blocks.

A skip over logic apparatus that functions to this end is shown in FIG. 8. As shown in FIG. 8, this skip over logic device 36 includes a hierarchy of memories which comprise a scanstripe pair mask memory 102, a block mask memory 104 and a sample area mask memory 106. The scanstripe pair mask memory 102 is assigned 1 bit per scanstripe pair and is organized as 512 by 1 bit. The block mask memory 104 is assigned 1 bit per each block in the image and is organized as 512 by 32 bits. Finally, the sample area mask memory 106 is assigned 1 bit per sample area per block and is organized as 512 by 32 times 32 bits.

As further shown in FIG. 8, there is associated with the block mask memory 104 a block mask logic device 108 and a block sequencer device 110. Associated, moreover, with the sample area mask memory 106, is a sample area mask logic device 112 and a sample area sequencer device 114. Finally, the skip over logic device 36 includes a FIFO (first in, first out) memory 116.

Figure 7C:
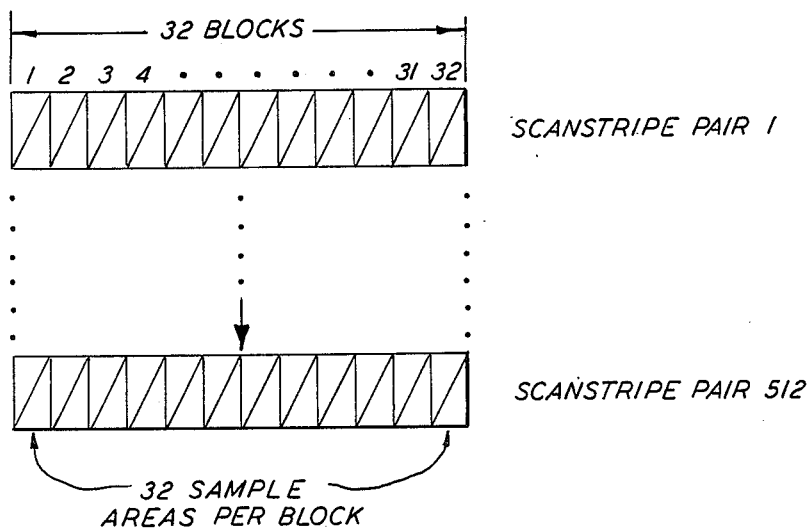

The hierarchy of skip over logic memories shown in the apparatus of FIG. 8 operates on, and in correspondence with, the hiearchy of entirely processed areas shown in FIGS. 7a-c. In order to provide a clear explanation of this operation, the following example is set forth. Thus, in this example, and with reference to FIG. 9a, it is assumed that, although the scanstripe mask memory 102 was originally (at the beginning of a field) initialized to one, after the processing of a previous face "P" it has an indicated configuration of zeros and ones at the time a new face "N" is to be processed. Here, the ones which have been written into the scanstripe mask memory 102 indicate that the pertinent scanstripe is not fully covered at that address. The zeros which have been written into the memory 102 indicate, on the other hand, that the pertinent scanstripe is full (entirely processed) at that address and may be skipped over. In our example, the scanstripe 0, 1 and 511 are not fully processed and must be processed, while the scanstripe 2, 6 and 7 are full (zeros) and may be skipped over.

The address information that a pertinent scanstripe is full (i.e., zeros) is provided along a line 118 for input to the vertical integrator 34. This address information is used by the vertical intergrator 34 as an instruction to skip over, for current processing, that pertinent scanstripe. Accordingly, the vertical integrator 34 functions to update to the next scanstripe pair in a manner outlined above. The address information that a pertinent scanstripe is not fully processed, on the other hand, is provided along a line 120 for input to the block mask memory 104.

Figures 9A, 9B, 9C:
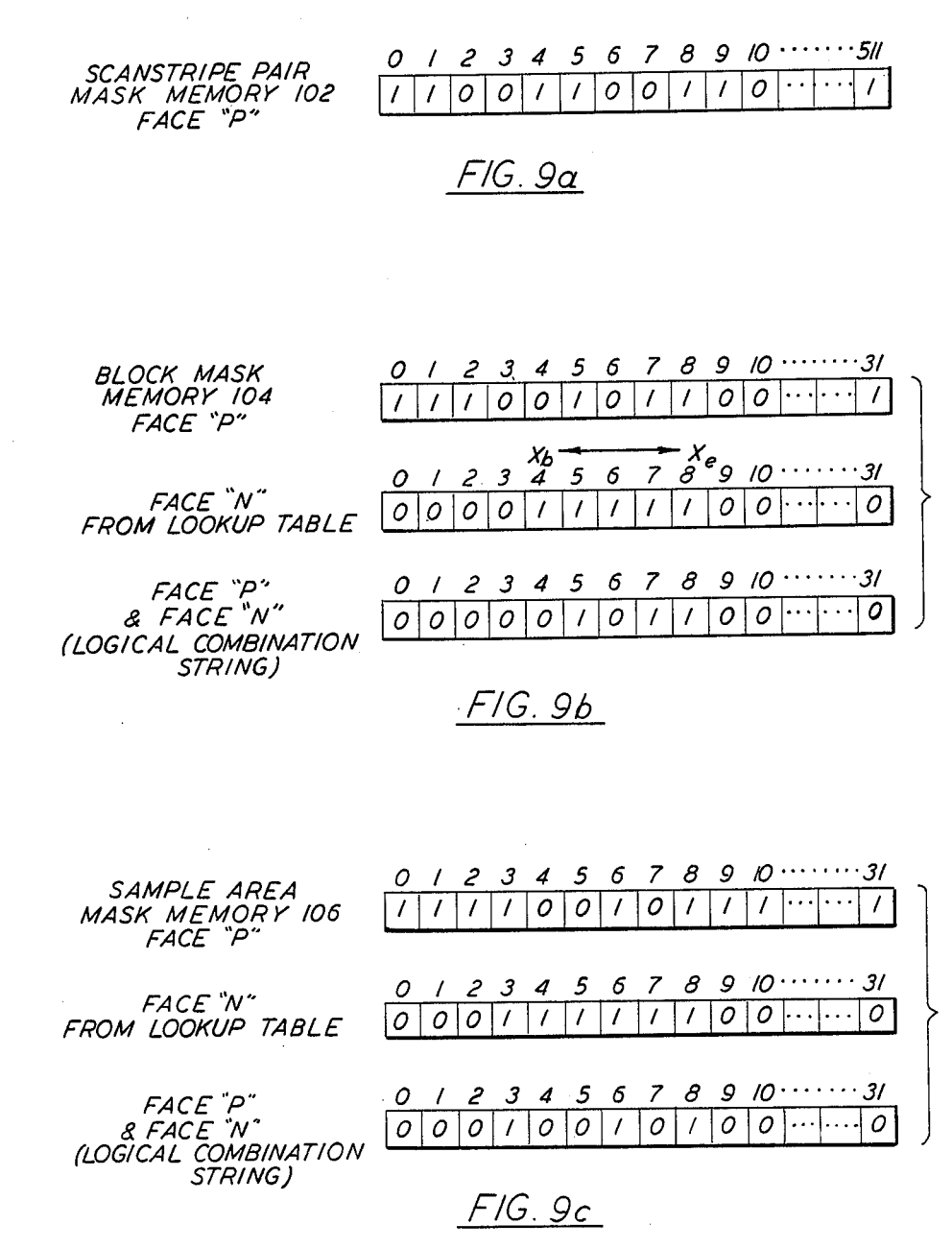

As shown in FIG. 9b, the block mask memory 104 has an indicated configuration of zeros and ones. Here, again, the zeros indicate that for some previous face "P", the pertinent block address (at the scanstripe address provided along the line 120) is full. And, again, the ones indicate that for some previous face "P", the pertinent block address (at the scanstripe address provided along the line 120) is not fully processed.

The block mask memory's 104 contents of ones and zeros are provided along a line 122 as a first input to the block mask logic device 108. The block mask logic device 108 also accepts as a second input, along the lines 124a, b, the parameters ($X_b$, $X_e$) which are used to look up a string of zeros and ones supplied from a lookup table. Here, in contradistinction to the meaning of zeros and ones employed above with respect to the mask memories, a zero indicates that for some new face "N", a pertinent block is not covered by the new face "N", while a one indicates that a pertinent block is covered by the new face "N". Hence, for the new face "N" shown in FIG. 9b, there is a string of ones between the locations of the beginning edges ($X_b$) and ending edges ($X_e$) of those blocks covered by the new face "N", and a string of zeros eleswhere.

The block mask logic device 108 functions to logically and the first and second inputs as shown in FIG. 9b and to output a logical combination string for subsequent input along a line 126 to the block sequencer device 110. The purpose of the block sequencer device 110, in turn, is to skip over the zero bits in the logical combination string and generate a sequence of block (BL) addresses which have to be processed. In order to implement this, the block sequencer device 110 employs a conventional priority encoder (not shown) which functions to generate the block address of the first left most non-zero bit in the logical combination string. This address, accordingly, is decoded, and at the same time, the corresponding bit in the logical combination string is cleared to zero. At this point, the priority encoder provides the address of the next non-zero bit, or provides an "empty" instruction along a line 128. The "empty" instruction enables the scanstripe pair mask memory 102 to provide the next scanstripe pair address along line 120 to the block mask memory 104.

The block addresses, therefore, that are determined by the block sequencer device 110 are provided as inputs to the sample area mask memory 106, the sample area mask logic device 112 and the FIFO memory 116 along the lines 130, 132 and 134, respectively. The sample area mask memory 106, in particular, as shown in FIG. 9c, has an indicated configuration of zeros and ones. Here, the zeros indicate that for some previous "P", the pertinent sample area address (at the scanstripe pair address provided along the line 120 and at the block address provided along the line 130) is full. The ones, on the other hand, indicate that for some previous face "P", the pertinent sample area address (at the scanstripe pair address provided along line 120 and at the block address provided along line 130) is not fully processed.

The sample area mask memory's 106 contents of ones and zeros are provided along a line 136 as a first input to the sample area mask logic device 112. The sample area logic device 112 also accepts as a second input, along the lines 138 and 140, a string of zeros and ones supplied from a lookup table, as shown in FIG. 9c. Here it is noted that a zero from the lookup table indicates that for some new face "N", a pertinent sample area is not covered by the new face "N", while on the other hand, a one from the lookup table indicates that for some new face "N", a pertinent sample area is covered by the new face "N".

The sample area mask logic device 112 functions to logically and its first (SAMASK) and second inputs (SACOV) and to output a logical combination string (PROCSA) as shown in FIG. 9c and FIG. 12, for subsequent input along a line 142 to the sample area sequencer device 114. The purpose of the sample area sequencer device 114, in turn, like that of the block sequencer device 110, described above, is to skip over the zero bits in the logical combination string and generate a sequence of sample area (SA) addresses which have to be processed. In order to implement this, the sample area sequencer device 114 employs a conventional priority encoder (not shown) which functions to generate the sample area address of the first left most non-zero bit in the logical combination string. This address, accordingly, is decoded and at the same time, the corresponding bit in the logical combination string is cleared to zero. At this point, the priority encoder provides the address of the next non-zero bit, or provides an "empty" instruction along a line 144. The "empty" instruction enables the block sequencer device 110 to advance to the next block for further processing.

The sample area addresses, therefore, that are determined by the sample area sequencer device 114 are provided as an input to the FIFO memory 116 along a line 146. From inspection of FIG. 8, it is observed that the FIFO memory 116 coordinates the information transmitted along the lines 120, 134 and 146 and compiles a sequence of scanstripe pair (SCP), block (BL) and sample area (SA) addresses for further input to the pixel processor system 38. The coordinated addresses [SCP, BL, SA] are saved in the FIFO memory 116 and provided to the pixel processor system 38 along the lines 60 and 62 (FIG. 4) in a first in, first out sequence.

In the example just employed to clarify the operation of the skip over logic device 36, it is asserted that the various mask memories have a configuration of zeros and ones which have already been written into these memories at the time the current processing of a face "N" is initiated. The write requests to these mask memories include a signal along the line 88 that the BON of the sample area is full. When in fact the BON of a sample area at a particular address is full, and thus detected by the skip over logic device 36, it selectively updates the sample area mask memory 106 from a one bit to a zero bit at the pertinent address (SCP, BL, SA). Correspondingly, the skip over logic device 36 itself detects when bits in the block mask memory 104 and scanstripe mask memory 102 are selectively updated from a one bit to a zero bit at the pertinent address where a block and scanstripe, respectively, have been entirely covered.

In order to provide continuity in the foregoing explanation of the operation of the present invention, a detailed explanation of the Bed of Nails generation operation is also reserved for the present moment. Accordingly, FIG. 5f shows an arbitrary beginning edge of a face passing through the convolution base of a sample point. In general, the BON for the face on the convolution base of the sample point can be looked up from a look up table, given the perpendicular difference (P) of the sample point from an edge and the line normal (Nx, Ny) of the edge.

FIG. 5g, moreover, depicts a situation in which two edges of a face pass through the convolution base of a sample point. For this case, the BON of the face on the convolution base of the sample point is computed as follows. First, the two edges are extended to the boundary of the convolution base, as shown in the figure. Then, the BON due to the two extended edges are computed independently, using the perpendiculer distance and edge normals, as described for one edge above. Finally, the BON due to the face on the convolution base of the sample point is given by the intersection of the two independently computed BON's (shown as a cross-hatched area in the FIG. 5g).

FIG. 12 shows a flow chart that describes the logic and method of the present invention. Specifically, the flow chart shows the logic from the initialized frame buffer memories as the system proceeds through the block mask, the sample area mask, the sample area sequencer and its relationship to the mask update spatial filter total integrator and the video mixer.

Figure 10:
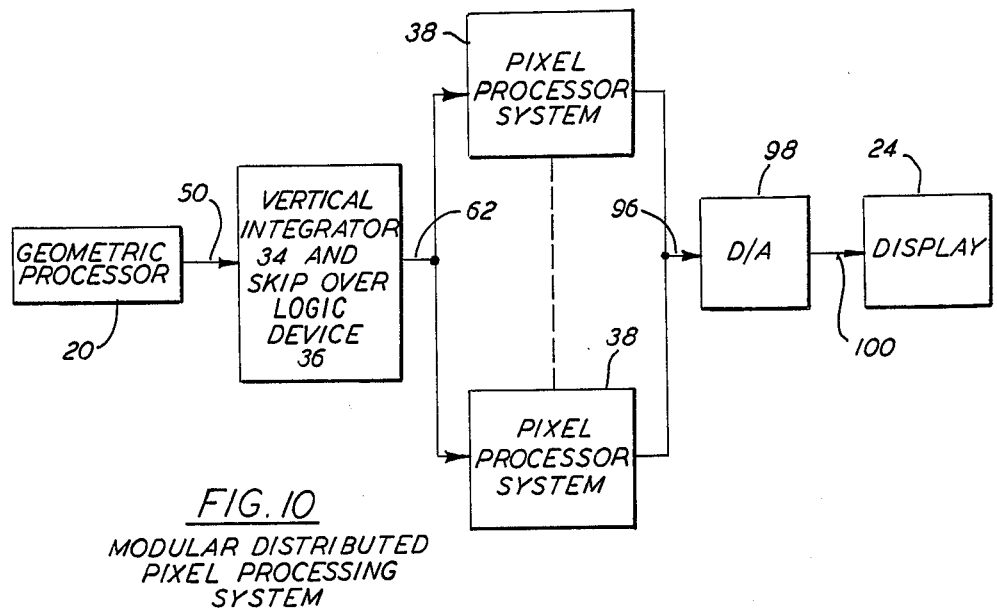
FIG. 10 is a block diagram showing a first alternative embodiment of the present invention that employs a modular distributed pixel processing system.

The preferred embodiment of the present invention, as set forth above, realizes a canonical schemata of the principals of the present invention. Alternative embodiments, on the other hand, include a multi-distributed pixel processing system of the type shown in FIG. 10. Here, a plurality of pixel processor 22 components are connected in parallel so that the processing load for one display is shared. Thus, for example, this arrangement enables a span, which is defined as a set of four contiguous sample areas, to be processed simultaneously by assigning e.g., a set of four pixel processor components to each of the four sample areas within the span.

Figure 11:
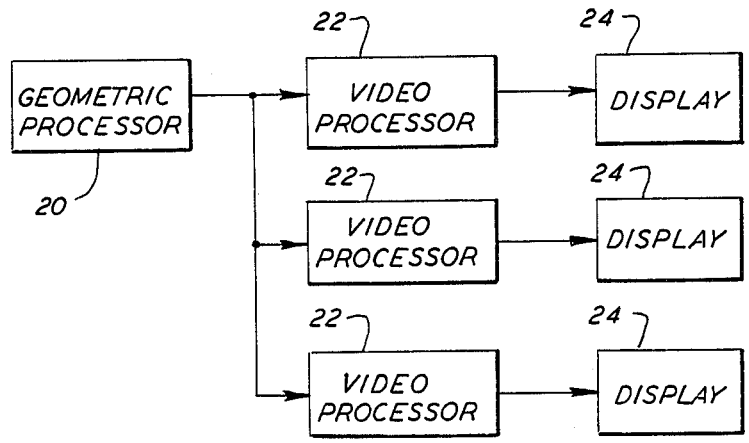
FIG. 11 is a block diagram showing a second alternative embodiment of the present invention that realizes a multichannel expansion of a modular DIG architecture.
Figure 12A:
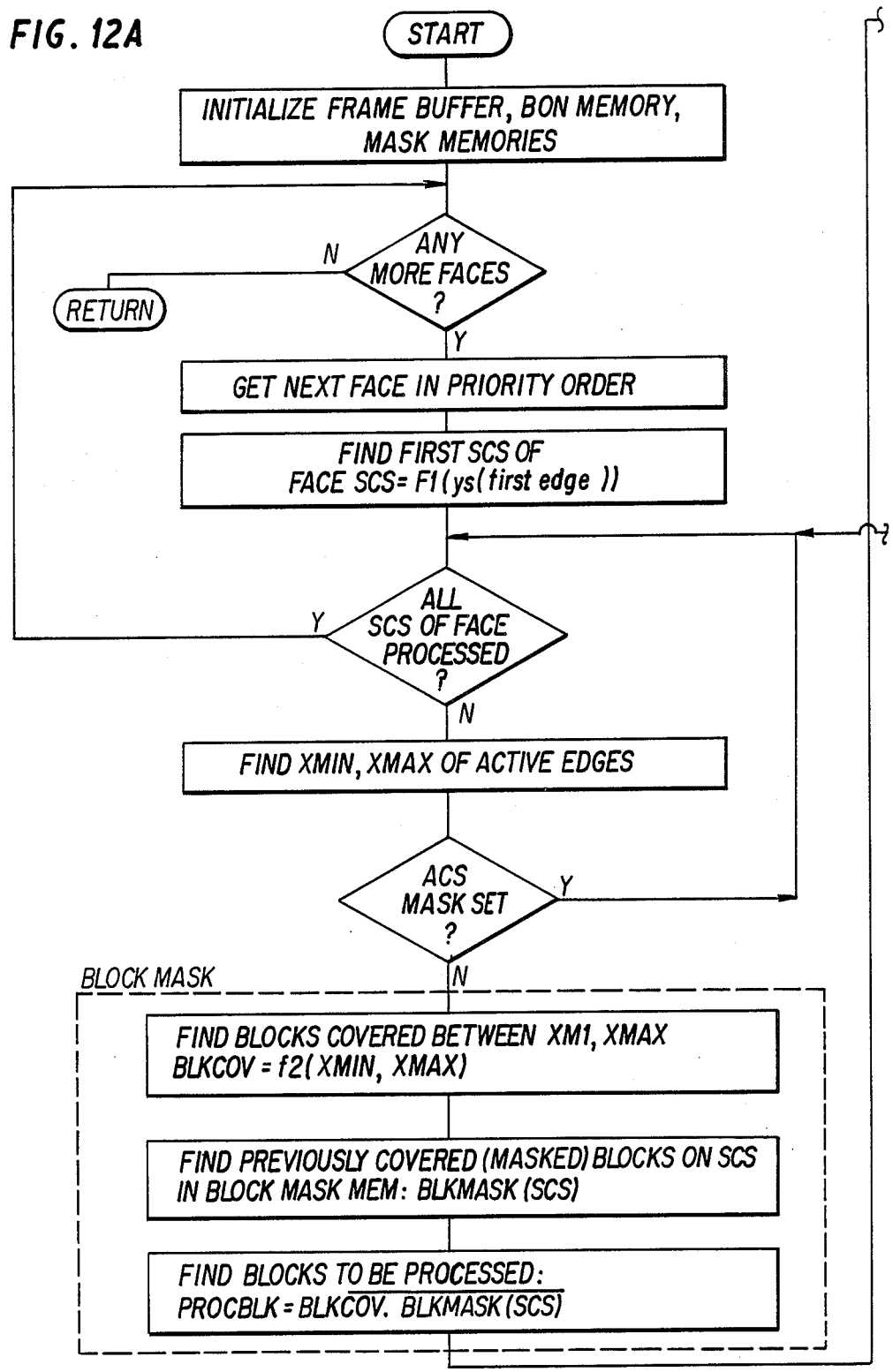
FIG. 12 is a flow chart detailing the method of operation of the invention.
Figure 12B:
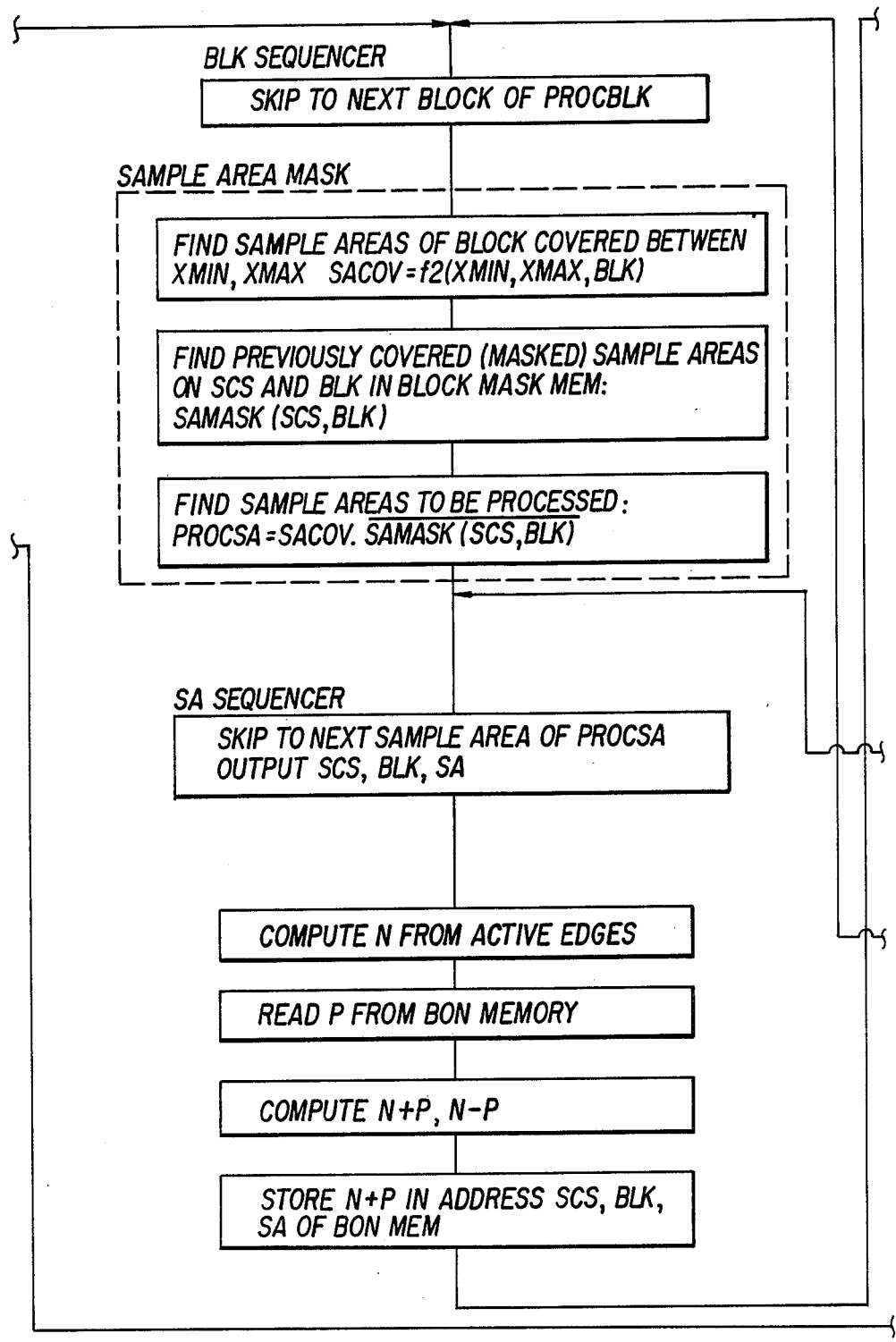
Figure 12C:
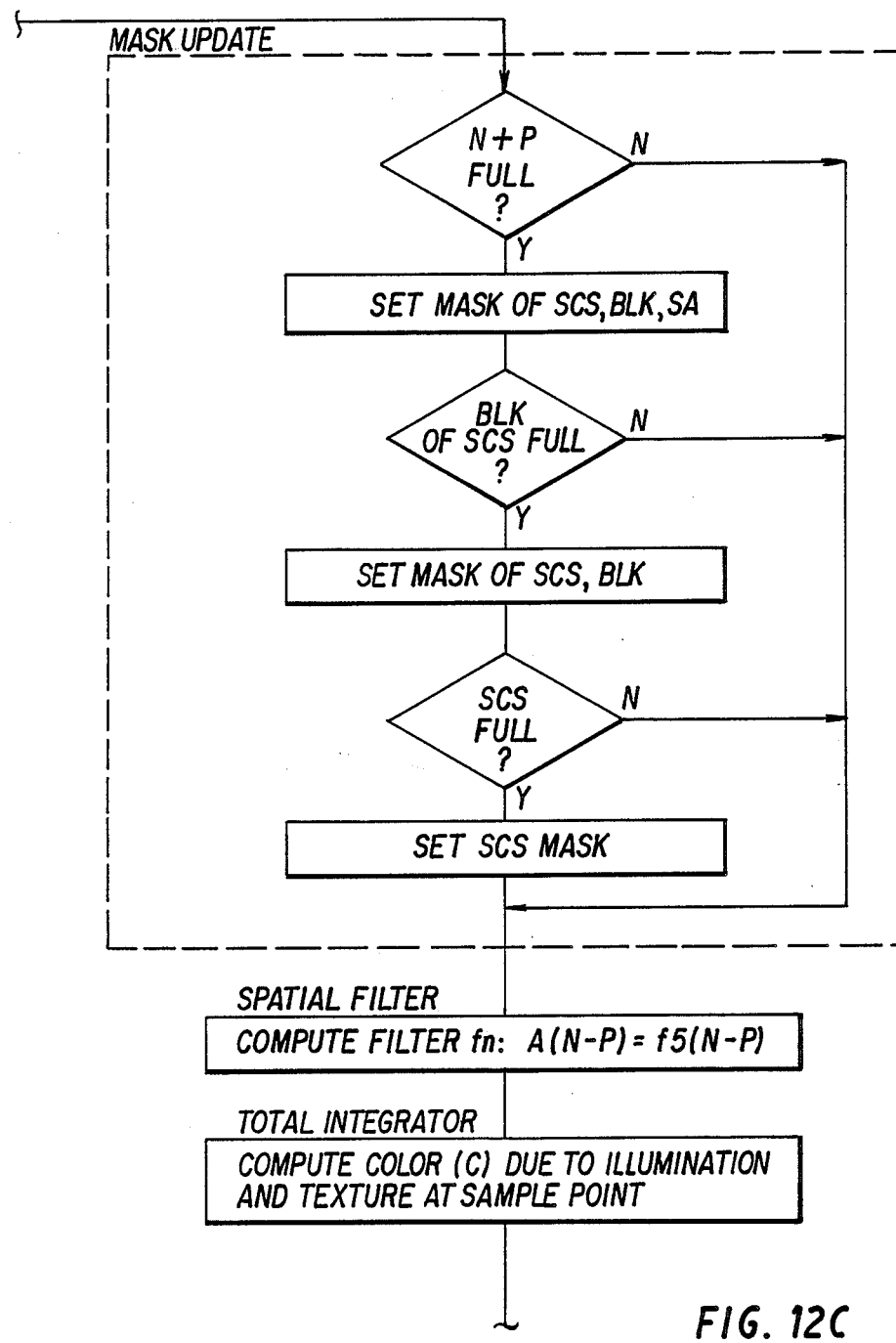
Figure 12D:
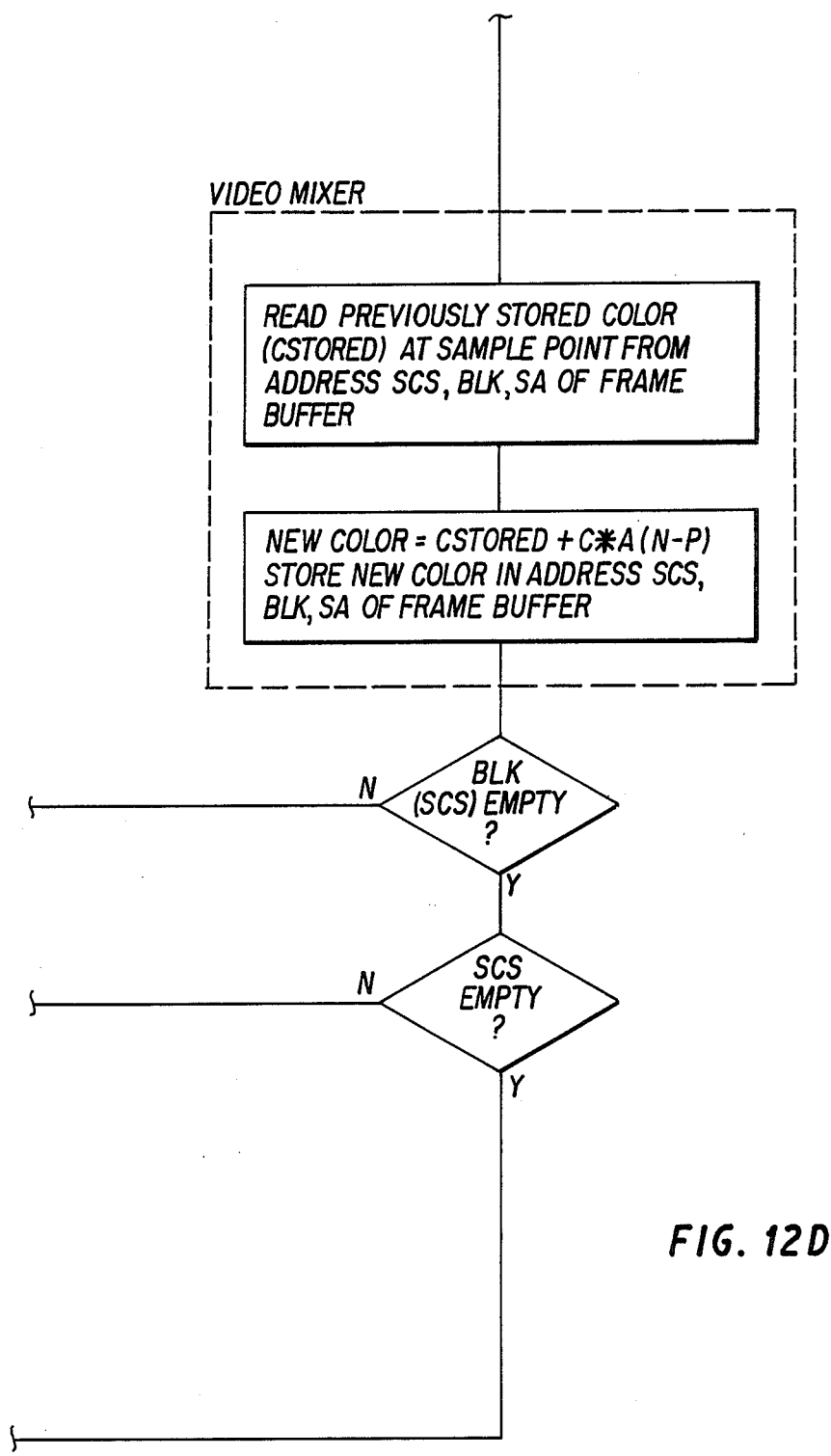

Other embodiments of the present invention include a multi-channel modular DIG of the type that is shown in FIG. 11. Here, the canonical system configuration is expanded so that the trainee pilot is provided with both front and side views. The expansion includes providing a single geometric processor 20 that inputs to a plurality of video processor 22 components. Each of the video processor 22 components, in turn, input to a separate display 24.

Although specific embodiments of the present invention have been described herein, it will be obvious to those skilled in the art that various modifications may be made without departing from the spirit of the invention. For example, within the framework of the modular DIG architecture as set forth above, a texture and translucency capability may be readily incorporated by making suitable modifications in the pixel processor 38. With the foregoing in mind, it is understood that the invention is intended to be limited solely by the appended claims.

We claim:

1. A digital image generator, comprising:
(1) a geometric processor means which processes a plurality of prioritized faces which comprise an image that is to be displayed and provides tonal and geometric information for each of said faces;
(2) at least one video processor means comprising:
 (a) a vertical integrator means connected to said geometric processor means which updates said geometric information for each of said faces to determine a set of candidate sample areas for further processing;
 (b) a skip over logic device connected to said vertical integrator means which identifies sample areas to be further processed and provides this information, in the form of an address location, to a tonal integrator and to a Bed of Nails (BON) device;
 (c) said tonal integrator connected to said geometric processor means which uses said tonal information to compute an intensity (I) of an identified sample area for input to a video mixer means;
 (d) said Bed of Nails (BON) device connected to said skip over logic device which employs quantization of an identified sample area to a subpixel resolution level, said quantization corresponding to the subpixel areas covered by a face within the convolution base of an identified sample area and providing, moreover,
  (i) a logical difference of the subpixel areas of a new face minus the subpixel areas of all of the previously processed faces, at an identified sample area, for input to a spatial filter means; and
  (ii) a logical union of the subpixel areas of all of the previously processed faces with the subpixel areas of a new face, at an identified sample area, for input to the skip over logic device upon detection that the subpixel area encompasses a predetermined area;
 (e) a spatial filter means connected to said Bed of Nails device which provides a characteristic for quantization of an identified sample area, and generates a number that corresponds to a fractional area encompassed by said logical difference for input to a video mixer means;
 (f) a video mixer means connected to said spatial filter means and to said tonal integrator, which functions
  (i) to multiply the intensity (I) of an identified sample area times the number outputted by said spatial filter means to produce a resultant intensity ($I_o$) of an identified sample area and to
  (ii) add the resultant intensity ($I_o$) to a previously stored value ($I_{stored}$) of the resultant intensity retrieved from a frame buffer memory, to produce an updated value of $I_{stored}$, which sum is inputted to the frame buffer memory;
 (g) a frame buffer memory connected to said video mixer means which stores cumulatively updated values of $I_{stored}$ for each sample point for a field's worth of displayed imagery;
(3) a digital to analog converter connected to said frame buffer memory that converts quantized values of $I_{stored}$ into an analog format for input to a display; and
(4) a display connected to said digital to analog converter.

2. The generator of claim 1, further comprising at least two video processor means, each video processor means connected in series with said geometric processor means and with a display.

3. The generator of claim 1 and 2, further comprising at least two pixel processor means, each particular pixel processor means connected in parallel with each other and connected in series with said geometric processor means and with a display.

4. The generator of claim 1, wherein said plurality of faces are prioritized in order of occultation.

5. The generator of claim 1, wherein said vertical integrator means further includes a first scanline update device which determines a first intersection area defined by a beginning edge of a face at the left most value of a scanstripe pair, and a second scanline update device which determines a second intersection area defined by an ending edge of a face at the right most value of a scanstripe pair, so that said set of candidate sample areas are included between said first and second intersection areas.

6. The generator of claim 1, wherein said skip over logic device includes a hierarchy of memory and logic components which operate on, and in correspondence with, a hierarchy of areas intersected by said faces, said hierarchy of areas intersected by said faces, said hierarchy of components comprising:
   (a) a scanstripe mask memory which provides a scanstripe address portion of an area as an input to said vertical integrator;
   (b) a block mask memory connected to a block mask logic device, in turn connected to a block sequencer device, which components provide a block address portion of an area as an input to a sample area mask memory;
   (c) said sample area mask memory connected to a sample area mask logic device, in turn connected to a sample area sequencer device, which components provide a sample area address portion of an area, as an input to a FIFO memory; and
   (d) a FIFO memory connected to said scanstripe masked memory, said block sequencer device and said sample area sequencer device, whereby the addresses of sample areas to be further processed are obtained.

7. The generator of claim 1, wherein said spatial filter means is characterized as a 2×2 spatial filter means.

8. The generator of claim 7, wherein said quantization of a sample area to a subpixel resolution level is organized so that a sample area is at the center of a 16 square grid.

9. The generator of claim 8, including weighting coefficients assigned to a quantized sample area are that all of equal weight.

10. The generator of claim 7, wherein quantization of a sample area to a subpixel resolution level is organized so that a sample area is located within an irregular or random quantization pattern.

11. The generator of claim 7, including weighting coefficients assigned to a quantized sample area that monotonically decrease in weight as they recede from the center of the sample area.

12. The generator of claim 1, wherein said spatial filter means is characterized as a 3×3 spatial filter means.

13. The generator of claim 6, wherein said frame buffer memory, scanstripe mask memory, block mask memory and sample area mask memory are double buffered so that a frame's worth of displayed imagery is processed by said video processor means.

14. A video processor for use in a digital image generator, said digital image generator also including a geometric processor that processes a plurality of prioritized faces that comprise an image that is to be displayed and includes tonal and geometric information for each of said faces comprising:
   vertical integrator means connected to said geometric processor means which updates said geometric information for each of said faces to determine a set of candidate sample areas for further processing;
   a tonal integrator connected to said geometric processor means which uses said tonal information to compute an intensity (I) of an identified sample area for input to a video mixer means;
   a Bed of Nails (BON) device connected to said vertical integrator which employs quantization of an identified sample area to a subpixel resolution level, said quantization corresponding to the subpixel areas covered by a face within the convolution base of an identified sample area and providing, moreover, a logical difference of the subpixel areas of a new face minus the subpixel areas of all of the previously processed faces, at an identified sample area, for input to a spatial filter means and a logical union of the subpixel areas of all of the previously processed faces with the subpixel area of a new face at an identified sample area for input to the vertical integrator upon detection that the subpixel area encompasses a predetermined area;
   a spatial filter means connected to said Bed of Nails device which provides a characteristic for quantization of an identified sample area, and generates a number that corresponds to a fractional area encompassed by said logical difference for input to a video mixer means;
   video mixer means connected to said spatial filter means and to said tonal integrator, which functions to multiply the intensity (I) of an identified sample area by the number outputted by said spatial filter means to produce a resultant intensity ($I_o$) of an identified sample area and to add the resultant intensity ($I_o$) to a previously stored value ($I_{stored}$) of the resultant intensity retrieved from a frame buffer memory, to produce an updated value of $I_{stored}$; which updated values is inputted to the frame buffer memory;
   a frame buffer memory connected to said video mixer means which stores cumulatively updated values of $I_{stored}$ for each sample point of displayed imagery;
   a digital to analog converter connected to said frame buffer memory that converts quantized values of $I_{stored}$ into an analog format for input to a display; and
   a display connected to said digital to analog converter.

* * * * *